United States Patent
Watanabe et al.

(10) Patent No.: US 7,906,239 B2
(45) Date of Patent: Mar. 15, 2011

(54) CATHODE ACTIVE MATERIAL, METHOD FOR PRODUCING THE SAME, AND NONAQUEOUS ELECTROLYTE SECONDARY BATTERY

(75) Inventors: Haruo Watanabe, Kanagawa (JP); Kenji Ogisu, Tokyo (JP); Tomoyo Ooyama, Fukushima (JP); Masanori Soma, Fukushima (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 11/681,558

(22) Filed: Mar. 2, 2007

(65) Prior Publication Data
US 2007/0292757 A1 Dec. 20, 2007

(30) Foreign Application Priority Data

Mar. 6, 2006 (JP) ................................. 2006-059724
Mar. 6, 2006 (JP) ................................. 2006-059725
Mar. 7, 2006 (JP) ................................. 2006-060689

(51) Int. Cl.
*H01M 4/48* (2010.01)
(52) U.S. Cl. ............... 429/231.3; 429/231.1; 429/231.2; 429/231.5; 429/231.6; 429/220; 429/221; 429/223; 429/224; 429/229; 252/182.1; 252/518.1; 252/520.1; 252/520.2; 252/520.21; 252/520.4; 252/520.5; 252/521.2

(58) Field of Classification Search ............... 429/231.3, 429/231.1, 231.2, 231.5, 231.6, 220, 221, 429/223, 224, 229; 252/182.1, 518.1, 520.1, 252/520.2, 520.21, 520.4, 520.5, 521.2
See application file for complete search history.

(56) References Cited

FOREIGN PATENT DOCUMENTS

| JP | 62-090863 | | 4/1987 |
|---|---|---|---|
| JP | 08-222219 | | 8/1996 |
| JP | 09-035715 | | 2/1997 |
| JP | 09-265985 | | 10/1997 |
| JP | 11-071114 | | 3/1999 |
| JP | 11-219706 | | 8/1999 |
| JP | 2001-106534 | | 4/2001 |
| JP | 2002-075367 | | 3/2002 |
| JP | 2003-04-25 | | 4/2003 |
| JP | 2004-139743 | | 5/2004 |
| JP | 2007-18743 | * | 1/2007 |

* cited by examiner

*Primary Examiner* — Laura S Weiner
(74) *Attorney, Agent, or Firm* — K&L Gates LLP

(57) ABSTRACT

A cathode active material capable of improving chemical stability, a method for producing the same, and a nonaqueous electrolyte secondary battery using the same which has high capacity and good charge-discharge cycling characteristics is provided. The cathode has a cathode active material. The cathode active material includes a coating layer formed on at least a part of the composite oxide particle, the coating layer including an oxide including lithium and an oxide including a coating element of nickel, or nickel and manganese, and a surface layer formed on at least a part of the coating layer and containing molybdenum.

6 Claims, 12 Drawing Sheets

CATHODE ACTIVE MATERIAL, METHOD FOR PRODUCING THE SAME, AND NONAQUEOUS ELECTROLYTE SECONDARY BATTERY

CROSS REFERENCES TO RELATED APPLICATIONS

The present application claims priority to Japanese Patent Application No. 2006-059724 filed on Mar. 6, 2006, Japanese Patent Application No. 2006-059725 filed on Mar. 6, 2006, and Japanese Patent Application No. 2006-060689 filed on Mar. 7, 2006, the entire contents of which are being incorporated herein by reference.

BACKGROUND

The present application relates to a cathode active material, a method for producing the cathode active material, and a nonaqueous electrolyte secondary battery; for example, a cathode active material containing a composite oxide including lithium Li and cobalt Co, a method of producing the cathode active material, and a nonaqueous electrolyte secondary battery using the cathode active material.

Recently, demands for small-sized secondary batteries having a high capacity have been increased with spread of portable devices such as video cameras and laptop computers. Although nickel-cadmium batteries using an alkaline electrolyte are currently used as the secondary battery, they have low battery voltages such as about 1.2 V, and it is difficult to improve their energy densities. For this reason, lithium metal secondary batteries using lithium metal, which have the lightest specific gravity among solid chemical elements such as 0.534, a very low potential, and the highest current capacity per unit weight among metal anode materials, have been studied.

In secondary batteries using the lithium metal as an anode, however, resinous lithium (dendrite) is precipitated on the surface of the anode while charging, and its growth is promoted by the charge-discharge cycle. The growth of the dendrite deteriorates the cycling characteristics of the secondary battery, and further causes a trouble that the dendrite erupts through a barrier membrane (separator) placed for preventing the cathode from contacting with the anode, thus resulting in an internal short-circuit.

In order to solve this problem, for example, Japanese Patent Application Laid-Open (JP-A) No. 62-90863 has proposed secondary batteries wherein a carbon material such as coke is used as an anode and the discharge and charge is repeated by de-doping and doping an alkali metal ion. It has been found that this kind of the secondary battery can avoid the deterioration of the anode caused by the repeat of discharge and charge as mentioned above.

On the other hand, inorganic compounds such as transition metal oxides and transition metal chalcogens including an alkali metal are known as a cathode active material capable of giving a battery voltage of about 4 V. Of these, lithium composite oxides such as lithium cobaltate and lithium nickelate are promising materials from the viewpoints of high voltage, stability and long duration of life.

In particular, a cathode active material mainly containing lithium cobaltate shows a high voltage, and it is expected that en energy density can be increased by increasing its charge voltage. When the charge voltage is increased, however, its cycling characteristics may be deteriorated. According to the related art, thus, a small amount of $LiMn_{1/3}Co_{1/3}Ni_{1/3}O_2$, or the like is added or another material is surface-coated to modify the cathode active material.

The above-mentioned technique in which the cathode active material is modified by surface-coating aims at obtaining a coating having high coatability, and various methods for solving the problem are proposed. For example, it is confirmed that a method for applying with a metal hydroxide gives good coatability, and examples of such a method include a method described in JP-A-9-265985 in which cobalt Co and manganese Mn are applied to the surface of lithium nickelate $LiNiO_2$ particles through a step of applying hydroxides thereof. In addition, for example, JP-A-11-71114 discloses a method in which non-manganese metal is applied to the surface of a lithium manganese composite oxide through a step of applying a hydroxide thereof.

In addition, for example, JP-A-2001-106534 describes molybdenum, in addition to many metals, as a metal which is applied to a cathode precursor, nickel hydroxide particles for increasing a tap density of the resulting cathode. Furthermore, cathode active materials having a surface layer containing molybdenum and/or tungsten, and lithium are known by, for example, JP-A-2002-75367.

Further, JP-A-2003-123749 describes that an oxygen-absorbing compound powder is mixed with a composite oxide mainly containing lithium nickelate and the resulting mixture is calcined to give a cathode active material, and vanadium compounds are listed as the oxygen-absorbing compound.

However, if a metal hydroxide is applied to composite oxide particles and the resulting particles are then heated, the calcination between the particles easily progresses, and the particles are easily bound to one another. As a result, when a conductive agent is mixed therewith in the production of a cathode, bound parts and particles are destroyed or cracked, and thus a coating layer is peeled off or defective surfaces of the particles are exposed. Such defective surfaces have very high activity as compared with that of the formed surfaces in calcination, and therefore, deterioration reactions of an electrolyte solution and a cathode active material easily occurs.

SUMMARY

Consequently, it is desirable to provide a cathode active material that has an improved chemical stability by inhibiting binding between particles, a method for producing the cathode active material, and a nonaqueous electrolyte secondary battery using the cathode active material, which has a high capacity and excellent charge-discharge cycling characteristics.

According to a first embodiment, there is provided a cathode active material including:

a coating layer which is formed on at least a part of a composite oxide particle and contains an oxide including lithium Li and an oxide(s) including a coating element(s) of nickel Ni, or nickel Ni and manganese Mn; and a surface layer which is formed on at least a part of the coating layer and includes molybdenum Mo, wherein the composite oxide particle has an average composition represented by formula 1.

$$Li_{(1+x)}Co_{(1-y)}M_yO_{(2-z)} \qquad \text{(formula 1)}$$

wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y \leq 0.50$, and $-0.10 \leq z \leq 0.20$.

In the first embodiment, a composition ratio of the nickel Ni and the manganese Mn in the coating layer is preferably within the range of 99:1 to 30:70.

In the first embodiment, it is preferable that not more than 40 mol % of the total amount of the nickel Ni and the manganese Mn in the oxides in the coating layer is substituted with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, and tungsten W.

In the first embodiment, an amount of the coating layer is preferably within the range of 0.5 wt % to 50 wt % based on the composite oxide particles.

Preferably, the cathode active material according to the first invention has an average particle size of 2.0 µm to 50 µm.

According to a second embodiment, there is provided a method for producing a cathode active material, including the steps of:

forming a layer which contains a hydroxide(s) including nickel Ni, or nickel Ni and manganese Mn on at least a part of a composite oxide particle having an average composition represented by the following formula 1, and then applying molybdic acid to at least a part of the composite oxide particle; and heating the resulting composite oxide particle after applying the molybdic acid to form, on at least a part of the composite oxide particle, a coating layer which contains an oxide including lithium Li and an oxide(s) including a coating element(s) of nickel Ni, or nickel Ni and manganese Mn, and a surface layer which includes molybdenum Mo.

$Li_{(1+x)}Co_{(1-y)}M_yO_{(2-z)}$ (formula 1)

wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

In the second embodiment, it is preferable that the hydroxide(s) including the nickel Ni, or the nickel Ni and the manganese Mn is/are formed by dispersing the composite oxide particles in a solvent mainly containing water and having a pH of not less than 12, and then adding a nickel Ni compound, or a nickel Ni compound and a manganese Mn compound thereto.

In the second embodiment, the solvent mainly containing water preferably contains lithium hydroxide.

In the second embodiment, a composition ratio of the nickel Ni and the manganese Mn in the coating layer is preferably within the range of 99:1 to 30:70.

In the second embodiment, it is preferable that not more than 40 mol % of the total amount of the nickel Ni and the manganese Mn in the oxides in the coating layer is substituted with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, and tungsten W.

In the second embodiment, an amount of the coating layer is preferably within the range of 0.5 wt % to 50 wt % based on the composite oxide particles.

In the second embodiment, the cathode active material preferably has an average particle size of 2.0 µm to 50 µm.

According to a third embodiment, there is provided a non-aqueous electrolyte secondary battery including:
a cathode having a cathode active material;
an anode;
a separator; and
an electrolyte, wherein
the cathode active material includes
a coating layer which is formed on at least a part of a composite oxide particle and contains an oxide including lithium Li and an oxide(s) including a coating element of at lease one of nickel Ni and manganese Mn, and a surface layer which is formed on at least a part of the coating layer and includes molybdenum Mo, and
the composite oxide particle has an average composition represented by formula 1.

$Li_{(1+x)}Co_{(1-y)}M_yO_{(2-z)}$ (formula 1)

wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

According to an embodiment, a cathode active material includes a coating layer which contains an oxide including lithium Li and an oxide(s) including a coating element(s) of nickel Ni, or nickel Ni and manganese Mn on at least a part of a composite oxide particle. Consequently, high charge voltage property and corresponding high energy density property can be realized, as well as good charge-discharge cycling characteristics are exhibited under a high charge voltage condition.

According to an embodiment, the binding between the particles can be inhibited by applying molybdic acid to the composite oxide particles coated with a hydroxide(s) including nickel Ni, or nickel Ni and manganese Mn in the cathode active material. In addition, since the cracking of the bound particles can be avoided, the increase of an activated surface area of the particles and destruction of the particles, which are caused by cracking, can be reduced, and the advantages of the coating layer can be fully utilized.

According to an embodiment, the stability of the cathode active material can be further improved. Also, a battery using this cathode active material can have a high capacity and an improved discharge and charge efficiency.

According to an embodiment, there is provided a cathode active material including:
a coating layer which is formed on at least a part of a composite oxide particle and contains an oxide including lithium Li and an oxide(s) including at least one coating element of nickel Ni and manganese Mn; and
a surface layer which is formed on at least a part of the coating layer and includes yttrium Y, wherein
the composite oxide particle has an average composition represented by formula 1.

$Li_{(1+x)}Co_{(1-y)}M_yO_{(2-z)}$ wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; and x, y and z satisfy the relationships of $-0.10 \leq x \leq 0.10$, $0 \leq y \leq 0.50$, and $-0.10 \leq z \leq 0.20$.

In the fourth embodiment, a composition ratio of the nickel Ni and the manganese Mn in the coating layer is preferably within the range of 100:0 to 30:70.

In an embodiment, it is preferable that not more than 40 mol % of the total amount of the nickel Ni and the manganese Mn in the oxides in the coating layer is substituted with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

In an embodiment, it is preferable that not more than 20 mol % of the total amount of the yttrium Y in the oxide in the surface layer is substituted with at least one metal element selected from the group consisting of magnesium Mg, boron B, titanium Ti, vanadium V, chromium Cr, manganese Mn, iron Fe, cobalt Co, aluminum Al, nickel Ni, copper Cu, zinc Zn, molybdenum Mo, tin Sn, calcium Ca, strontium Sr, tungsten W, and zirconium Zr.

In an embodiment, an amount of the coating layer is preferably 0.5 part by weight to 50 parts by weight based on 100 parts by weight of the composite oxide particles.

In an embodiment, an amount of the surface layer is preferably 0.1 part by weight to 10 parts by weight based on 100 parts by weight of the cathode active material, the amount of the yttrium Y being considered as a weight amount of yttrium oxide $Y_2O_3$.

The cathode active material according to an embodiment preferably has an average particle size of 2.0 μm to 50 μm.

According to an embodiment, there is provided a method for producing a cathode active material, including the steps of:

forming a layer which contains a hydroxide(s) including nickel Ni and/or manganese Mn on at least a part of a composite oxide particle having an average composition represented by the following formula 1, and then forming a hydroxide including yttrium Y on at least a part of the composite oxide particle; and heating the resulting composite oxide particle after forming the hydroxide including yttrium Y to form, on at least a part of the composite oxide particle, a coating layer which contains an oxide including lithium Li and an oxide(s) including at least one coating element of nickel Ni and manganese Mn, and a surface layer which includes yttrium Y.

$$Li_{(1+x)}Co_{(1-y)}M_yO_{(2-z)} \quad \text{(formula 1)}$$

wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; and x, y and z satisfy the relationships of $-0.10 \leq x \leq 0.10$, $0 \leq y \leq 0.50$, and $-0.10 \leq z \leq 0.20$.

In an embodiment, it is preferable that the hydroxide(s) including the nickel Ni and/or the manganese Mn is/are formed by dispersing the composite oxide particles in a solvent mainly containing water and having a pH of not less than 12, and then adding a nickel Ni compound and/or a manganese Mn compound thereto.

In an embodiment, the solvent mainly containing water preferably contains lithium hydroxide.

In an embodiment, a composition ratio of the nickel Ni and the manganese Mn in the coating layer is preferably within the range of 100:0 to 30:70.

In an embodiment, it is preferable that not more than 40 mol % of the total amount of the nickel Ni and the manganese Mn in the oxides in the coating layer is substituted with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

In an embodiment, it is preferable that not more than 20 mol % of the total amount of the yttrium Y in the oxide in the surface layer is substituted with at least one metal element selected from the group consisting of magnesium Mg, boron B, titanium Ti, vanadium V, chromium Cr, manganese Mn, iron Fe, cobalt Co, aluminum Al, nickel Ni, copper Cu, zinc Zn, molybdenum Mo, tin Sn, calcium Ca, strontium Sr, tungsten W, and zirconium Zr.

In an embodiment, an amount of the coating layer is preferably within the range of 0.5 part by weight to 50 parts by weight based on 100 parts by weight of the composite oxide particles.

In an embodiment, an amount of the surface layer is preferably within the range of 0.1 part by weight to 10 parts by weight based on 100 parts by weight of the cathode active material, the amount of the yttrium Y being considered as a weight amount of yttrium oxide $Y_2O_3$.

In an embodiment, the cathode active material preferably has an average particle size of 2.0 μm to 50 μm.

According to an embodiment, there is provided a nonaqueous electrolyte secondary battery including:
a cathode;
an anode;
a separator; and
an electrolyte, wherein
the cathode has a cathode active material,
the cathode active material includes
a coating layer which is formed on at least a part of a composite oxide particle and contains an oxide including lithium Li and an oxide(s) including at least one coating element of nickel Ni and manganese Mn, and
a surface layer which is formed on at least a part of the coating layer and contains an oxide including yttrium Y, and
the composite oxide particle has an average composition represented by formula 1.

$$Li_{(1+x)}Co_{(1-y)}M_yO_{(2-z)} \quad \text{(formula 1)}$$

wherein M is magnesium Mg, aluminum Al, boron B, titanium Ti, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; and x, y and z satisfy the relationships of $-0.10 \leq x \leq 0.10$, $0 < y < 0.50$, and $-0.10 \leq z \leq 0.20$.

According to an embodiment, a cathode active material includes a coating layer which contains an oxide including lithium Li and an oxide(s) including a coating element of at least one of nickel Ni and manganese Mn on at least a part of the composite oxide particle. Consequently, high charge voltage property and corresponding high energy density property can be realized, as well as good charge-discharge cycling characteristics are exhibited under a high charge voltage condition.

In an embodiment, the binding between the particles can be inhibited by forming a hydroxide including yttrium Y on the composite oxide particles coated with a hydroxide(s) including nickel Ni and/or manganese Mn in the cathode active material. In addition, since the cracking of the bound particles can be avoided, increase of an activated surface area of the particles and destruction of the particles, which are caused by cracking, can be reduced, and the advantages of the coating layer can be fully utilized.

According to an embodiment, the chemical stability of the cathode active material can be further improved. Also, a battery using this cathode active material can have a high capacity and an improved discharge and charge efficiency.

According to an embodiment, there is provided a cathode active material including:
a coating layer which is formed on at least a part of a composite oxide particle and contains an oxide including lithium Li and an oxide(s) including a coating element(s) of nickel Ni, or nickel Ni and manganese Mn; and
a surface layer which is formed on at least a part of the coating layer and includes vanadium V, wherein the composite oxide particle has an average composition represented by formula 1.

$$Li_{(1+x)}Co_{(1-y)}M_yO_{(2-z)} \quad \text{(formula 1)}$$

wherein M is magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

In an embodiment, a composition ratio of the nickel Ni and the manganese Mn in the coating layer is preferably within the range of 100:0 to 30:70.

In an embodiment, it is preferable that not more than 40 mol % of the total amount of the nickel Ni and the manganese Mn in the oxides in the coating layer is substituted with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, and tungsten W.

In an embodiment, an amount of the coating layer is preferably within the range of 0.5 wt % to 50 wt % based on the composite oxide particles.

The cathode active material according to an embodiment preferably has an average particle size of 2.0 μm to 50 μm.

According to an embodiment, there is provided a method for producing a cathode active material, including the steps of:

forming a layer which contains a hydroxide(s) including the nickel Ni, or the nickel Ni and the manganese Mn on at least a part of a composite oxide particle having an average composition represented by the following formula 1, and then coating vanadic acid on at least a part of the composite oxide particle; and heating the resulting composite oxide particle after coating the vanadic acid to form, on at least a part of the composite oxide particle, a coating layer which contains an oxide including lithium Li and an oxide(s) including a coating element(s) of nickel Ni, or nickel Ni and manganese Mn, and a surface layer which includes vanadium V.

$$Li_{(1+x)}Co_{(1-y)}M_yO_{(2-z)} \quad \text{(formula 1)}$$

wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

In an embodiment, it is preferable that the hydroxide(s) including the nickel Ni, or the nickel Ni and the manganese Mn is/are formed by dispersing the composite oxide particles in a solvent mainly containing water and having a pH of not less than 12, and then adding a nickel Ni compound, or a nickel Ni compound and a manganese Mn compound thereto.

In an embodiment, the solvent mainly containing water preferably contains lithium hydroxide.

In an embodiment, a composition ratio of the nickel Ni and the manganese Mn in the coating layer is preferably within the range of 100:0 to 30:70.

In an embodiment, it is preferable that not more than 40 mol % of the total amount of the nickel Ni and the manganese Mn in the oxides in the coating layer is substituted with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, and tungsten W.

In an embodiment, an amount of the coating layer is preferably within the range of 0.5 wt % to 50 wt % based on the composite oxide particles.

In an embodiment, the cathode active material preferably has an average particle size of 2.0 μm to 50 μm.

According to an embodiment, there is provided a nonaqueous electrolyte secondary battery including:
a cathode having a cathode active material;
an anode;
a separator; and
an electrolyte, wherein
the cathode active material includes
a coating layer which is formed on at least a part of a composite oxide particle and contains an oxide including lithium Li and an oxide(s) including a coating element of nickel Ni, or nickel Ni and manganese Mn, and
a surface layer which is formed on at least a part of the coating layer and includes vanadium V, and
the composite oxide particle has an average composition represented by formula 1.

$$Li_{(1+x)}Co_{(1-y)}M_yO_{(2-z)} \quad \text{(formula 1)}$$

wherein M is magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

According to an embodiment, a cathode active material includes a coating layer which contains an oxide including lithium Li and an oxide(s) including a coating element(s) of nickel Ni, or nickel Ni and manganese Mn on at least a part of a composite oxide particle. As a consequence, high charge voltage property and corresponding high energy density property can be realized, as well as good charge-discharge cycling characteristics are exhibited under a high charge voltage condition.

In an embodiment, the binding between the particles can be inhibited by applying vanadic acid to the composite oxide particles applied with a hydroxide(s) including nickel Ni, or nickel Ni and manganese Mn in the cathode active material. In addition, since the cracking of the bound particles can be avoided, increase of an activated surface area of the particles and destruction of the particles, which are caused by cracking, can be reduced, and the advantages of the coating layer can be fully utilized.

According to an embodiment, the stability of the cathode active material can be further improved. Also, a battery using this cathode active material can have a high capacity and an improved discharge and charge efficiency.

Additional features and advantages are described herein, and will be apparent from, the following Detailed Description and the figures.

DETAILED DESCRIPTION

Figure 1:
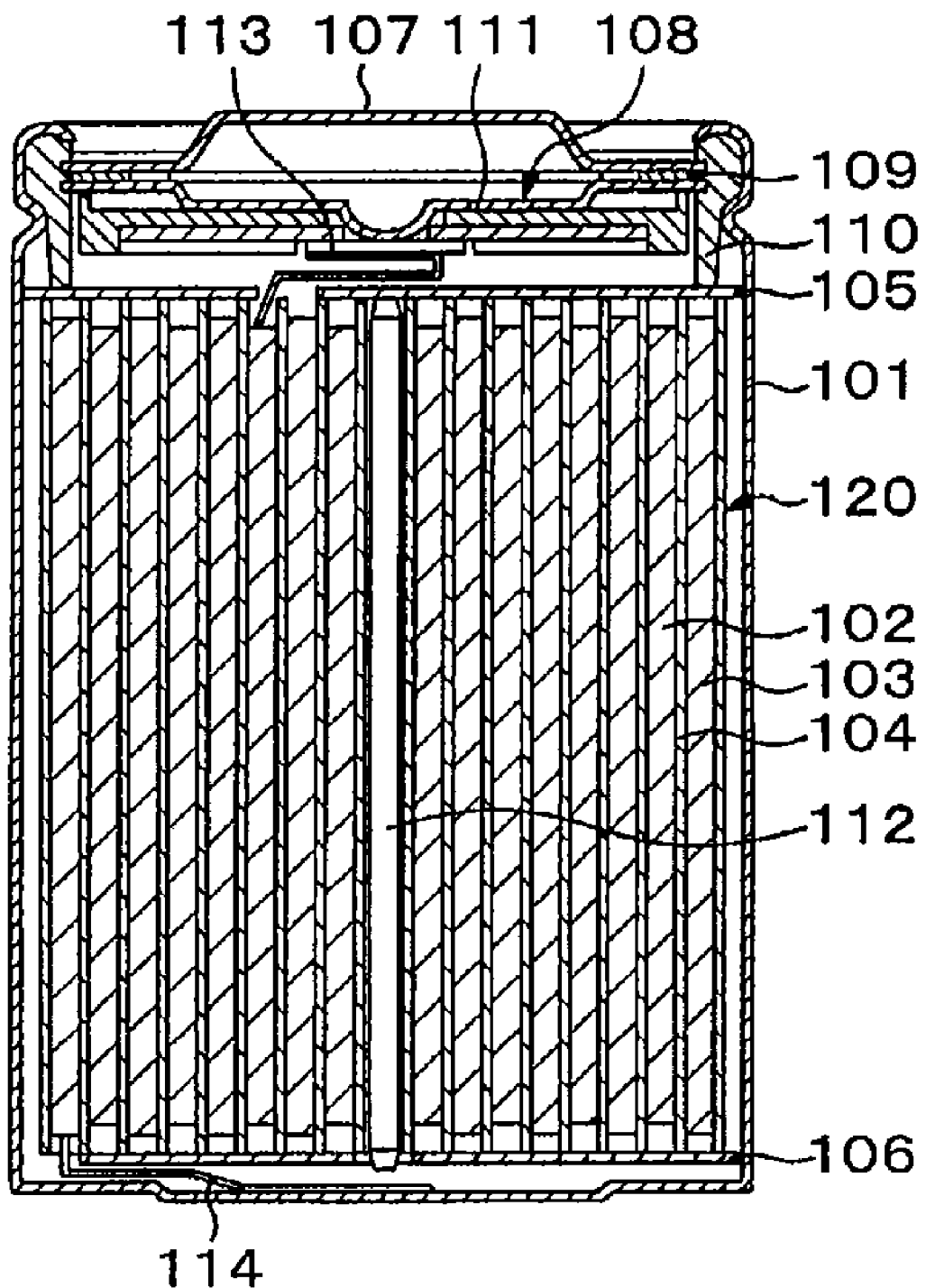
FIG. 1 is a schematic cross-sectional view showing a first embodiment which is a nonaqueous electrolyte secondary battery using a cathode active material according to an embodiment.

A cathode active material according to one embodiment has a coating layer which contains an oxide including lithium Li and an oxide(s) including a coating element(s) of nickel Ni, or nickel Ni and manganese Mn on at least a part of a composite oxide particle, and has a surface layer which includes molybdenum Mo on at least a part of the coating layer.

First, the reason that the cathode active material has the above-mentioned configuration will be explained. Cathode active materials mainly containing lithium cobaltate $LiCoO_2$ have high charge voltage property and corresponding high energy density property, but their capacities remarkably lower by repeating charge and discharge cycle under a high capacity at a high charge voltage. The lowering is due to surface state of the cathode active material, and the necessity of a surface treatment of the cathode active material is pointed out.

Consequently, various surface treatments are proposed. From the viewpoints that a capacity per volume or weight is not lowered or lowering of a capacity is minimized, cathode active materials having high charge voltage property, and corresponding high energy density property, as well as good charge-discharge cycling characteristics at a high charge voltage can be obtained by inhibiting the lowering of the capacity, or coating a material which contributes to inhibition of the lowering the capacity on the surface.

It has been found that it is possible to obtain cathode active materials having high charge voltage property and corresponding high energy density property, though they are lower a little, as well as good charge-discharge cycling characteristics of the high capacity under a high charge voltage condition. The cathode active materials are obtained by forming a coating layer which contains an oxide including lithium Li and an oxide(s) including at least one coating element of nickel Ni and manganese Mn on a cathode active material mainly containing lithium cobaltate $LiCoO_2$.

As a method of forming a coating layer on composite oxide particles, the following two methods may be proposed. In one method, a lithium Li compound, and a nickel Ni compound and/or a manganese Mn compound are pulverized with composite oxide particles to give fine particles, and they are dry-mixed, applied to each other, and calcined to form a coating layer which contains an oxide including the lithium Li and an oxide(s) including the coating element(s) of at least one of the nickel Ni and the manganese Mn on the surface of the composite oxide particles. In the other method, a lithium Li compound, and a nickel Ni compound and/or a manganese Mn compound are dissolved in or mixed with a solvent, and subjected to wet-application and then calcination to form a coating layer which contains an oxide including the lithium Li and an oxide(s) including at least one coating element of the nickel Ni and the manganese Mn on the surface of the composite oxide particles. However, these methods give the results that it may be impossible to obtain a high uniform coating.

It has been found that a coating layer is formed by applying a hydroxide(s) of nickel Ni and/or manganese Mn and dehydrating the resulting product with heating to give a coating layer having high uniformity. According to this application treatment, a nickel Ni compound and/or a manganese Mn compound are/is dissolved in a solvent system mainly containing water, then composite oxide particles are dispersed in the solvent system, and a base is added to the dispersion system, or the like to increase the basicity of the dispersion system, whereby hydroxide(s) including the nickel Ni and/or the manganese Mn are precipitated on the surface of the composite oxide particles.

The composite oxide particles to which the hydroxide(s) of nickel Ni and/or manganese Mn are/is applied by the application treatment are dehydrated with heating to form a coating layer on the composite oxide particles. As a consequence, uniformity of the coating on the composite oxide particles can be improved.

It has been found that in a step of applying a hydroxide(s) including nickel Ni and/or manganese Mn to the surface of the composite oxide particles, and then washing, dehydrating and drying the resulting particles for calcination, the particles are bound to each other through the hydroxide(s) including the nickel Ni and/or the manganese Mn applied on the surface. It has also been found that, when the bound particles are cracked, the interfacial peeling occurs between the hydroxide(s) including the nickel Ni and/or the manganese Mn and the composite oxide particles because of the relatively lower adhesive property, or cohesion failure is caused in the hydroxide(s) including the nickel Ni and/or the manganese Mn because of the low cohesion force, which may impair the improvement of the characteristic properties of the cathode active material by forming the coating layer.

In addition, it has also been found that if the calcination process to which lithium Li is added is continued in the presence of the bound particles, or in the state that particles having the hydroxide(s) including the nickel Ni and/or the manganese Mn on their surfaces are brought into contact with each other, the sintering between the particles tends to easily advance.

When the sintering between the particles advances too much, the following problems are raised. When a cathode is formed, it is required to increase an input of mechanical energy for use in cracking of the particles, which is conducted for uniformly mixing the particles with a binder and a conductive agent, carbon particles. Consequently, the cathode active material including the composite oxide particles having the coating layer is damaged or broken, resulting in an increased number of the defective particles in totality.

The failure or breakdown appears as breaking of a connecting part between the sintered particles, formation of fissure in the particles, fracture of the particles, peeling-off of the coating layer, and the like. In particular, the composite oxide particles having the coating layer tend to have an uneven surface rather than a smooth surface, as compared with the cathode active material mainly containing lithium cobaltate $LiCoO_2$. From this constitution, when an external force is applied to them, probably, the particles hardly slide on each other, and the external force is easily concentrated on a spot, whereby the failure or the breakdown easily occurs.

As a result, a surface where the coating layer is not formed is exposed. In other words, the surface having no coating layer, which does not function for improving the charge-discharge cycling characteristics, and an active newborn surface are exposed. This deteriorates the charge-discharge cycling characteristics under a high charge voltage condition at a high capacity. As is known well, the exposed surface is active and has a high surface energy. Such a surface has, accordingly, very high activity in decomposition reaction of the electrolyte solution and elution activity, as compared with surfaces formed in a usual calcination.

In order to improve the cathode functions and the production process, the present inventors have advanced intensive study based on the sintering between the particles. As a result, they have found that when a composite oxide particle whose surface has been applied with a hydroxide(s) including nickel Ni, or nickel Ni and manganese Mn, is further applied with molybdic acid, the progress of sintering can be improved. It has been also found that the failure or breakdown of the particles can be reduced, accordingly. Next, a composite oxide, a coating layer, and a surface layer will be described.

[Composite Oxide]

The composite oxide particle has, for example, an average composition represented by the formula 1. The composite oxide particle has the average composition represented by the formula 1, and thus may have a high capacity and a high discharge voltage.

$$Li_{(1+x)}Co_{(1-y)}M_yO_{(2-z)} \quad \text{(formula 1)}$$

wherein M is at least one element selected the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

In the formula 1, x is in the range of $-0.10 \leq x \leq 0.10$, preferably $-0.08 \leq x \leq 0.08$, and more preferably $-0.06 \leq x \leq 0.06$. When the value of x is less than the above-mentioned range, the discharge capacity may lower. When the value of x is more than the above-mentioned range, lithium may diffuse out of the particles, and the basicity control in a subsequent treatment step may be impaired, finally resulting in a harmful influence on promotion of gelation while kneading a cathode paste.

y is in the range of $0 \leq y < 0.50$, preferably $0 \leq y < 0.40$, and more preferably $0 \leq y < 0.30$. When the value of y is more than the above-mentioned range, the high charge voltage property possessed by $LiCoO_2$, and corresponding high energy density property may be impaired.

z is in the range of $-0.10 \leq z \leq 0.20$, preferably $-0.08 \leq z \leq 0.18$, and more preferably $-0.06 \leq z \leq 0.16$. When the value of z is less than or more than the above-mentioned range, it tends to lower the discharge capacity.

Although materials which are available as a cathode active material can be usually used as a starting material of the composite oxide particles, in some cases, particles obtained by cracking secondary particles with a ball mill, a kneader or the like may be used.

[Coating Layer]

The coating layer is formed on at least a part of the composite oxide particle, and contains an oxide including lithium Li and an oxide(s) including a coating element(s) of nickel Ni, or nickel Ni and manganese Mn. Formation of such a coating layer gives high charge voltage property and corresponding high energy density property, and also can improve charge-discharge cycling characteristics under a high charge voltage condition at a high capacity.

It is preferable that the coating layer has both of nickel Ni and manganese Mn because good charge-discharge cycling characteristics can be obtained. More specifically, a composition ratio of nickel Ni and manganese Mn is preferably within the range of 99:1 to 30:70, more preferably 99:1 to 40:60. It is preferable that the coating layer has both of the oxides of nickel Ni and manganese Mn as the oxides. This is because if an amount of the manganese Mn is more than the above-mentioned range, occlusive property of lithium Li may lower, finally resulting in lowering of the capacity of the cathode active material and increasing an electric resistance when using it in a battery. The above-mentioned range of the composition ratio of the nickel Ni and the manganese Mn is a range showing better effectiveness, in other words, in this range the progress of the sintering between the particles is inhibited, in the process of calcinating a precursor to which lithium Li is added.

It is possible to substitute the nickel Ni and the manganese Mn in the oxides in the coating layer with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, and tungsten W.

The substitution makes it possible to improve the stability of the cathode active material and the diffusibility of the lithium ion. An amount of the selected metal element substituted is not more than 40 mol %, of the total amount of the nickel Ni and the manganese Mn in the oxides in the coating layer, preferably not more than 30 mol %, and more preferably not more than 20 mol %. If the amount of the selected metal element substituted is more than the above-mentioned range, the occlusive property of the lithium Li and the capacity of the cathode active material may lower.

The amount of the coating layer is 0.5 wt % to 50 wt % of the composite oxide particles, preferably 1.0 wt % to 40 wt %, and more preferably 2.0 wt % to 35 wt %. This is because when the amount of the coating layer is more than the above-mentioned range, the capacity of the cathode active material lowers; while when the amount of the coating layer is less than the above-mentioned range, the stability of the cathode active material lowers.

[Surface Layer]

The surface layer is formed on at least a part of the coating layer, and includes molybdenum Mo. Formation of the surface layer may inhibit the binding between the particles. Also, the surface layer including molybdenum Mo probably contributes to the effects of the above-mentioned coating layer. Elution activity of the surface is further inhibited by the surface layer, as compared with the case where only the coating layer is formed.

An average particle size of the cathode active material is from 2.0 μm to 50 μm. When the average particle size is less than 2.0 μm, peeling-off occurs by press during the production of the cathode, and it is required to increase amounts of a conductive agent and a binder to be added because the surface area of the active material is increased, and therefore, it tends to lower energy density per unit weight. On the other hand, when the average particle size is more than 50 μm, the particles tend to pass through a separator, thus resulting in a short circuit.

[Method for Producing Cathode Active Material]

Next, a method for producing a cathode active material according to one embodiment will be described. The method for producing a cathode active material according to one embodiment is divided into two steps: a first step of forming a layer which contains a hydroxide(s) including nickel Ni, or nickel Ni and manganese Mn on at least a part of a composite oxide particle, and then applying molybdic acid to at least a part of the composite oxide particle; and a second step wherein heating the composite oxide particle after applying the molybdic acid to form, on at least a part of the composite oxide particle, a coating layer which contains an oxide including lithium Li and an oxide(s) including a coating element(s) of nickel Ni, or nickel Ni and manganese Mn, and a surface layer which includes molybdenum Mo.

(First Step)

In the first step, application treatment of a hydroxide(s) including nickel Ni, or nickel Ni and manganese Mn, and application treatment of molybdic acid are performed. According to the first step, for example, composite oxide particles are first dispersed in a solvent system mainly containing water in which a nickel Ni compound, or a nickel Ni compound and a manganese Mn compound is/are dissolved. Then, a base is added to the dispersion system, or the like to increase the basicity of the dispersion system, whereby a hydroxide(s) including the nickel Ni, or the nickel Ni and the manganese Mn is/are precipitated on the surface of the composite oxide particles. Also, composite oxide particles may be dispersed in a basic solvent mainly containing water, and then a nickel Ni compound, or a nickel Ni compound and a manganese Mn compound may be added to the aqueous solution, to thereby precipitate a hydroxide(s) including the nickel Ni, or the nickel Ni and the manganese Mn.

Examples of the starting material of the nickel Ni compound may include inorganic compounds such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogen sulfide, nickel nitride, nickel nitrite, nickel phosphate, and nickel thiocyanate; and organic compounds such as nickel oxalate and nickel acetate. They may be used as they are, or may be treated with an acid or the like to be converted into compounds capable of dissolving in a solvent system, as occasion demands.

Examples of the starting material of the manganese Mn compound may include inorganic compounds such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrosulfide, manganese nitrate, manganese hydrogen sulfate, manganese thiocyanate, manganese nitrite, manganese phosphate, manganese dihydrogen phosphate, and manganese hydrogen carbonate; and organic compounds such as manganese oxalate and manganese acetate. They may be used as they are, or may be treated with an acid or the like to be converted into compounds capable of dissolving in a solvent system, as occasion demands.

A pH of the above-mentioned solvent system mainly containing water is not less than pH 12, preferably not less than pH 13, and more preferably not less than pH 14. The higher the pH of the solvent system mainly containing water, the better the uniformity of the application of the hydroxide(s) including the nickel Ni, or the nickel Ni and the manganese Mn as well as the higher the reaction accuracy. Thus, the productivity is improved due to the shortened treatment time, and the quality is improved. The pH of the solvent system mainly containing water is decided depending on the cost of an alkali to be used, and the like.

The temperature of the dispersion system during treatment is not less than 40° C., preferably not less than 60° C., and more preferably not less than 80° C. The higher the temperature of the dispersion system during treatment, the better the uniformity of the application of the hydroxide(s) including the nickel Ni, or the nickel Ni and the manganese Mn, and the higher the reaction speed. Thus, the productivity is improved due to the shortened treatment time, and the quality is improved. A treatment conducted at 100° C., using an autoclave can be preferred from the viewpoint of the improvement of the uniformity of the application and the productivity due to the shortened treatment time caused by improvement in the faster reaction speed, although it is decided depending on the balance between the cost of the apparatus and the productivity.

The pH of a solvent system mainly containing water can be adjusted by dissolving an alkali in the solvent system mainly containing water. Examples of the alkali may include lithium hydroxide, sodium hydroxide, potassium hydroxide, and mixtures thereof. Although the pH may be adjusted by appropriately using the above-mentioned alkali, it is preferable to use lithium hydroxide, from the viewpoint of the purity and performance of the resulting cathode active material according to one embodiment. The advantage of using lithium hydroxide is as follows. That is, when the composite oxide particles on which the hydroxide(s) including the nickel Ni, or the nickel Ni and the manganese Mn is/are formed are taken out of the solvent system mainly containing water, the amount of the lithium in the resulting cathode active material according to one embodiment can be controlled by controlling the application mass of the solvent mainly containing water.

Subsequently, molybdic acid is applied to at least a part of the composite oxide particles on which the layer which contains the hydroxide(s) including the nickel Ni, or the nickel Ni and the manganese Mn is formed. The application treatment of the molybdic acid is effectively performed in a state in which the composite oxide particles are suspended in the solvent system mainly containing water which is used in the application treatment of the hydroxide including the nickel Ni, or the nickel Ni and the manganese Mn. By using this system, in a step in which the composite oxide particles on which the layer which contains the hydroxide(s) including the nickel Ni, or the nickel Ni and the manganese Mn is/are formed are dehydrated and dried, it is possible to inhibit the binding of the particles through the hydroxide(s) including the nickel Ni, or the nickel Ni and the manganese Mn on the surface.

Preferably, it is effective that the application treatment of the molybdic acid is performed in a washing step after the application treatment of the hydroxide including the nickel Ni, or the nickel Ni and the manganese Mn. Employing this process makes it possible to prevent leakage of the molybdic acid added to the suspension system as well as to improve absorption property. Further, utilizing the application treatment of the molybdic acid gives an effect for promoting particle aggregation without causing binding between the particles in the suspension system, and it is possible to easily perform washing and recovery of the particles from the dispersion system.

Examples of the starting material of the molybdic acid compound which can be used in the application treatment may include ammonium molybdate, potassium molybdate, sodium molybdate, lithium molybdate, molybdic acid, and molybdic anhydride.

An amount of the molybdic acid applied is from 0.00001 wt % to 1.0 wt % based on the weight of the composite oxide particles. The amount is preferably from 0.0001 wt % to 0.1 wt %. When the amount of the molybdic acid applied is more than the above-mentioned range, the capacity of the cathode active material lowers. When the amount of the molybdic acid applied is less than the above-mentioned range, the stability of the cathode active material lowers.

(Second Step)

In the second step, the composite oxide particles subjected to the application treatment in the first step are separated from the solvent system mainly containing water, and then, the obtained particles are heated to dehydrate the hydroxide(s) to form a coating layer which contains an oxide including lithium Li and an oxide(s) including the coating element(s) of the nickel Ni, or the nickel Ni and the manganese Mn on the surface of the composite oxide particles. It is preferable that the heat treatment is performed in an oxidative atmosphere including air or pure oxygen at a temperature of about 300° C. to 1000° C. In this case, the molybdic acid adheres to the hydroxide(s) including the nickel Ni, or the nickel Ni and the manganese Mn, which inhibits the sintering between the particles and the binding between the particles.

The composite oxide particles, which have been subjected to the application treatment in the first step, are separated from the solvent system, and thereafter, if necessary, the particles may be impregnated with an aqueous solution of a lithium compound in order to adjust the amount of the lithium, followed by heating the resulting particles.

Examples of the lithium compound may include inorganic compounds such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrosulfide, lithium sulfate, lithium hydrogensulfate, lithium nitride, lithium azide, lithium nitrite, lithium phosphate, lithium dihydrogen phosphate, and lithium hydrogencarbonate; and organic compounds such as methyl lithium, vinyl lithium, isopropyl lithium, butyl lithium, phenyl lithium, lithium oxalate, and lithium acetate.

After the calcination, as occasion demands, the particle size may be adjusted by using light pulverization, classification, or the like.

Next, a nonaqueous electrolyte secondary battery using the cathode active material according to one embodiment mentioned above will be described.

(1) First Embodiment of Nonaqueous Electrolyte Secondary Battery (1-1) Configuration of Nonaqueous Electrolyte Secondary Battery FIG. 1 shows a cross-sectional structure of a nonaqueous electrolyte secondary battery using the cathode active material according to the first embodiment.

The secondary battery has an open-circuit voltage of, for example, not less than 4.25 V and not more than 4.65 V per a pair of cathode and anode under a full charge state.

The secondary battery is a so-called cylindrical battery, and has a wound electrode assembly 120 in a battery can 101 which is a substantially hollow cylinder. The wound electrode assembly 120 is configured such that a strip cathode 102 and a strip anode 103 are wound via a separator 104.

The battery can 101 is composed of, for example, iron Fe plated with nickel Ni, whose one end is closed and the other end is open. Inside of the battery can 101, a pair of insulating plates 105 and 106 are placed perpendicularly to a winding circumference so as to sandwich the wound electrode assembly 120 therebetween.

To the open end of the battery can 101 are attached a battery lid 107, and a safety valve mechanism 108 and a positive temperature coefficient element (PTC element) 109, which are formed at the inside of the battery lid 107, by crimping via a gasket 110. The inside of the battery can 101 is sealed. The battery lid 107 is made of, for example, the same material as the battery can 101. The safety valve mechanism 108 is electrically connected to the battery lid 107 through the positive temperature coefficient element 109. When the internal pressure of the battery becomes not less than a certain value by an internal short-circuit or heat from the outside, then a disc plate 111 is reversed to cut the electric connection between the battery lid 107 and the wound electrode assembly 120. When a temperature is raised, the positive temperature coefficient element 109 controls an electric current by increased electrical resistivity, thereby preventing an unusual amount of heat caused by the high electric current. The gasket 110 is composed of, for example, an insulating material, whose surface is coated with asphalt.

The wound electrode assembly 120 has, for example, a center pin 112 around which the electrodes are wound. To the cathode 102 in the wound electrode assembly 120 is connected a cathode lead 113 made of, for example, aluminum Al or the like, and to the anode 103 is connected an anode lead 114 made of, for example, nickel Ni or the like. The cathode lead 113 is electrically connected to the battery lid 107 by being welded to the safety valve mechanism 108, and the anode lead 114 is electrically connected to the battery can 101 by welding.

[Cathode]

Figure 2:
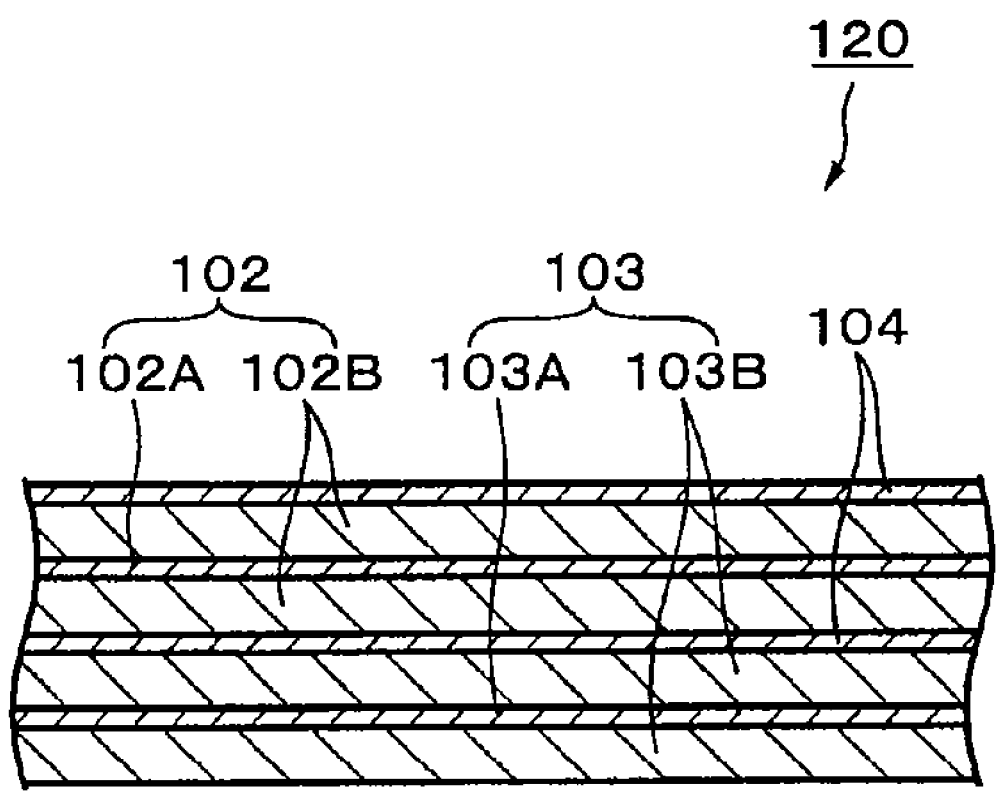
FIG. 2 is an enlarged cross-sectional view showing a part of a wound electrode assembly shown in FIG. 1.

FIG. 2 is an enlarged view showing a part of the wound electrode assembly 120 shown in FIG. 1. As shown in FIG. 2, the cathode 102 has, for example, a cathode current collector 102A having a pair of faces facing to each other, and cathode mixture layers 102B formed on both sides of the cathode current collector 102A. The cathode mixture layer 102B may be formed in an area of only one side of the cathode current collector 102A. The cathode current collector 102A is composed of, for example, a metal foil such as aluminum Al foil. The cathode mixture layer 102B includes, for example, a cathode active material, and may include, if necessary, a conductive agent such as graphite and a binder such as polyvinylidene fluoride. As the cathode active material, the cathode active material according to the embodiment mentioned above may be used.

[Anode]

As shown in FIG. 2, the anode 103 has, for example, an anode current collector 103A having a pair of faces facing to each other, and anode mixture layers 103B formed on both sides of the anode current collector 103A. The anode mixture layer 103B may be formed in an area of only one side of the anode current collector 103A. The anode current collector 103A is composed of, for example, a metal foil such as copper Cu foil. The anode mixture layer 103B includes, for example, an anode active material and may include, if necessary, a binder such as polyvinylidene fluoride.

The anode active material includes an anode material which can absorb and release lithium Li (hereinafter, sometimes, referred to as a "anode material capable of absorbing/releasing lithium Li"). Example of the anode material capable of absorbing/releasing lithium Li may include carbon materials, metal compounds, oxides, sulfides, lithium nitrides such as $LiN_3$, lithium metals, metals forming an alloy together with lithium, and polymer materials.

Examples of the carbon material may include low-graphitized carbons, easily-graphitized carbons, graphite, pyrocarbons, cokes, glassy carbons, organic polymer compound sintered bodies, carbon fibers, and activated carbon. Of these, the cokes may include pitch coke, needle coke, and petroleum coke. The organic polymer compound sintered bodies refer to materials which are obtained by calcinating a polymer material such as a phenol plastic or a furan resin at an appropriate temperature to carbonize it, some of which are classified into low-graphitized carbons or easily-graphitized carbons. Examples of the polymer material may include polyacetylene and polypyrrole.

Among such anode materials capable of absorbing/releasing lithium Li, materials having a charge and discharge voltage near to that of lithium metal are preferable. This is because the lower the charge and discharge voltage of the anode 103, the battery more easily has a higher energy density. Of these, the carbon materials are preferable because they have only a small change of their crystal structures on charge and discharge, and thus, good cycling characteristics as well as a high charge and discharge capacity can be obtained. The graphite is particularly preferable because it can give large electrochemical equivalent and a high energy density. The low-graphitized carbon is also preferable because it can give good cycling characteristics.

Further, the anode material capable of absorbing/releasing lithium Li may include lithium elemental metal, metal elements and semi-metal elements capable of forming an alloy together with lithium Li, alloys and compounds including such an element, and the like. These materials are preferable because they can give a high energy density. In particular, it is more preferable to use them together with the carbon material because, in such a case, good cycling characteristics as well as a high energy density can be obtained. The alloy used herein includes, in addition to alloys including two or more metal elements, alloys containing one or more metal elements and one or more semi-metal elements. The alloy may be in the state of a solid solution, eutectic crystal (eutectic mixture), intermetallic compound, and mixture of thereof.

Examples of the metal element and the semi-metal element may include tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, and hafnium Hf. Examples of the above-mentioned alloy and compound may include materials having the chemical formula: $Ma_sMb_tLi_u$ and materials having the chemical formula: $Ma_pMc_qMd_r$. In the chemical formulas, Ma denotes at least one element of metal elements and semi-metal elements capable of forming an alloy together with lithium; Mb denotes at least one element of metal elements and semi-metal elements other than lithium and Ma; Mc denotes at least one element of non-metal elements; Md denotes at least one element of metal elements and semi-metal elements other than Ma; and s, t, u, p, q and r satisfy $s>0$, $t\geq 0$, $u\geq 0$, $p>0$, $q>0$, and $r\geq 0$.

Of these, metal elements and semi-metal elements of Group IVB Short Periodic Table, and alloys and compounds including such an element are preferable, and silicon Si, tin Sn, and alloys and compounds including Si and/or Sn are particularly preferable. They may be crystals or amorphous.

In addition, inorganic compounds including no lithium Li such as $MnO_2$, $V_2O_5$, $V_6O_{13}$, NiS, and MoS may be used in either cathode or anode.

[Electrolyte Solution]

As a electrolyte solution, a nonaqueous electrolyte solution obtained by dissolving an electrolyte salt in a nonaqueous solvent may be used. Preferable nonaqueous solvent may be, for example, solvents including at least one of ethylene carbonate and propylene carbonate because they can improve cycling characteristics. It is particularly preferable to contain a mixture of ethylene carbonate and propylene carbonate in the electrolyte because the cycling characteristics can further be improved. Nonaqueous solvents preferably contain at least one ester selected from chain carbonic acid esters such as diethyl carbonate, dimethyl carbonate, ethyl methyl carbonate, and methyl propyl carbonate are also preferable because they can further improve cycling characteristics.

Nonaqueous solvents containing at least one of 2,4-difluoroanisole and vinylene carbonate are also preferable. This is because the 2,4-difluoro anisole can improve discharge capacity and the vinylene carbonate can improve cycling characteristics. Nonaqueous solvents containing a mixture thereof are more preferable because both of the discharge capacity and the cycling characteristics can be improved.

The nonaqueous solvent may further contain at least one compound of butylene carbonate, γ-butyrolactone, γ-valerolactone, compounds thereof whose hydroxyl group(s) is/are all or partially substituted with a fluorine-containing group(s), 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropyl nitrile, N,N-dimethylformamide, N-methylpyrrolidinone, N-methyloxazolidinone, N,N-dimethyl imidazolidinone, nitromethane, nitroethane, sulfolane, dimethylsulfoxide, and trimethyl phosphate.

In some cases, the refersibility of an electrode reaction can be improved by using the substance included in the above-mentioned nonaqueous solvents, whose hydroxyl group(s) all or partially is/are substituted with fluorine atom, depending on an electrode to be combined. These materials may be appropriately used.

Suitable examples of the lithium salt as the electrolyte salt may include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2(ox)$ lithium difluoro (oxalato) borate, LiBOB, and LiBr. They may be used alone or as a mixture of thereof. Of these, $LiPF_6$ is preferable because it can obtain high ionic conductivity and improve the cycling characteristics.

[Separator]

Now, a separator material which can be used in the first embodiment will be described. As the separator material, materials which have been used for conventional batteries can be used. Among them, it is particularly preferable to use microporous polyolefin films, which have good effect for preventing short-circuit and can improve stability of the battery by shutdown effect. For example, microporous films made of polyethylene resin or polypropylene resin are preferable.

As the separator material, it is also preferable to use laminates or mixtures of polyethylene having a lower shutdown temperature and polypropylene having high acid resistance, from the viewpoint that shutdown performance and floating property are well-balanced.

(1-2) Method for Producing Nonaqueous Electrolyte Secondary Battery

Next, a method for producing a nonaqueous electrolyte secondary battery will be described. The method will be described, referring to a cylindrical nonaqueous electrolyte secondary battery as one example.

A cathode 102 is produced as follows. First, for example, a cathode active material, a conductive agent and a binder are mixed to prepare a cathode mixture, and then, the resulting cathode mixture is dispersed in a solvent such as N-methyl-2-pyrrolidone to give a slurry of the cathode mixture.

Subsequently, the slurry of the cathode mixture is coated on a cathode current collector 102A and the solvent is dried, and then, compression-molding is performed using a roller press or the like to form a cathode mixture layer 102B, from which a cathode 102 is formed.

An anode 103 is produced as follows. First, for example, an anode active material and a binder are mixed to prepare an anode mixture, and then, the resulting anode mixture is dispersed in a solvent such as N-methyl-2-pyrrolidone to give a slurry of the anode mixture.

Subsequently, the slurry of anode mixture is coated on an anode current collector 103A and the solvent is dried, and then, compression-molding is performed using a roll press or the like to form an anode mixture layer 103B, from which an anode 103 is formed.

Next, a cathode lead 113 is attached to the cathode current collector 102A by, for example, welding, and an anode lead 114 is also attached to the anode current collector 103A by welding or the like. Then, the cathode 102 and the anode 103 are wound via a separator 104, and the tip end of the cathode lead 113 is welded to a safety valve mechanism 108 while the tip end of the anode lead 114 is welded to the battery can 101. Then, the wound cathode 102 and anode 103 are sandwiched between a pair of insulating plates 105 and 106, which is housed in the battery can 101.

Then, an electrolyte solution is injected into the battery can 101, whereby the separator 104 is impregnated with the electrolyte solution. Subsequently, a battery lid 107, the safety valve mechanism 108 and a positive temperature coefficient element 109 are crimped at the open end of the battery can 101 via a gasket 110 to fix them to produce a nonaqueous electrolyte secondary battery.

Figure 3:
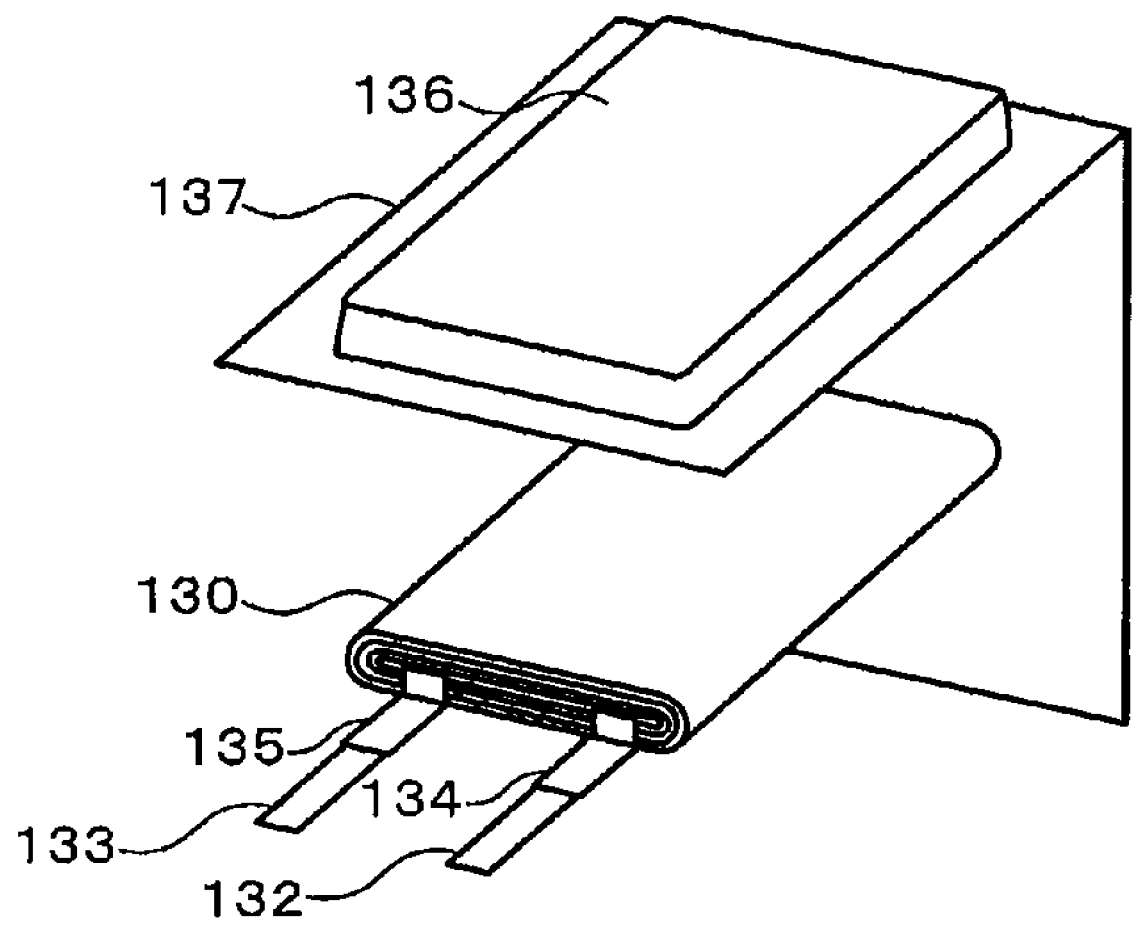
FIG. 3 is a schematic view showing a second embodiment which is a nonaqueous electrolyte secondary battery using a cathode active material according to an embodiment.

(2) Second Embodiment of Nonaqueous Electrolyte Secondary BATTERY (2-1) Configuration of Nonaqueous Electrolyte Secondary Battery FIG. 3 shows a structure of a nonaqueous electrolyte secondary battery using the cathode active material according to one embodiment. As shown in FIG. 3, the nonaqueous electrolyte secondary battery has a structure in which a battery element 130 is housed in a covering material 137 made of a moisture-proof laminate film and the periphery of the battery element 130 is welded to seal. The battery element 130 has a cathode lead 132 and an anode lead 133, and these leads are sandwiched with the covering material 137 and drawn to the outside. Both sides of the cathode lead 132 and the anode lead 133 are coated with resin pieces 134 and resin pieces 135, respectively, in order to improve adhesive property to the covering material 137.

[Covering Material]

The covering material 137 has a laminate structure obtained by sequentially laminating, for example, an adhesive layer, a metal layer, and a surface-protecting layer. The adhesive layer is composed of a polymeric film, and examples of the material forming the polymeric film may include polypropylene (PP), polyethylene (PE), cast polypropylene (CPP), linear low density polyethylene (LLDPE), and low density polyethylene (LDPE). The metal layer is composed of a metal foil, and examples of the material forming the metal foil may include aluminum Al. As the material forming the metal foil, metals other than aluminum Al may be used. Examples of the material used for the surface-protecting layer may include nylon Ny and polyethylene terephthalate (PET). The surface of the adhesive layer faces the battery element 130.

[Battery Element]

Figure 4:
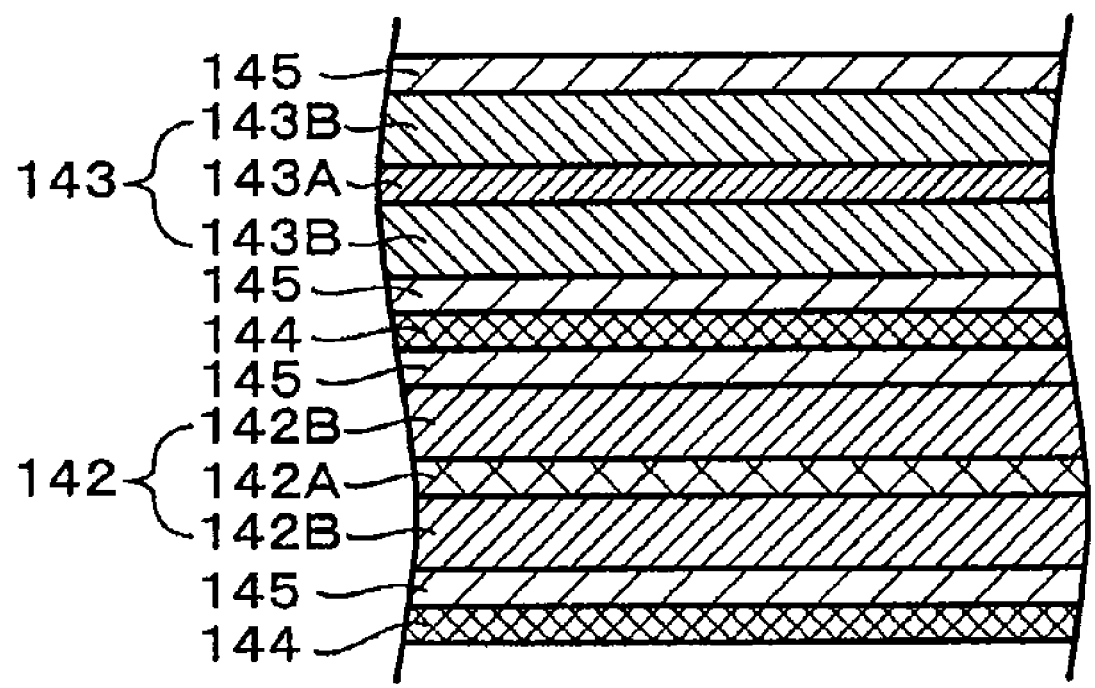
FIG. 4 is an enlarged cross-section showing a part of a battery element shown in FIG. 3.

The battery element 130 is, for example as shown in FIG. 4, a wound battery element 130 wherein a strip anode 143 having gel electrolyte layers 145 formed on both sides thereof, a separator 144, a strip cathode 142 having gel electrolyte layers 145 formed on both sides thereof, and a separator 144 are laminated to be wound in a longitudinal direction.

The cathode 142 is composed of a strip cathode current collector 142A, and cathode mixture layers 142B formed on both sides of the cathode current collector 142A. The cathode current collector 142A is a metal foil made of, for example, aluminum Al.

At one end of the cathode 142 in a longitudinal direction is formed a cathode lead 132 which is connected to the electrode by spot welding or ultrasonic welding. As a material for the cathode lead 132, metals such as aluminum may be used.

The anode 143 is composed of a strip anode current collector 143A, and anode mixture layers 143B formed on both sides of the anode current collector 143A. The anode current collector 143A is composed of a metal foil such as copper Cu foil, nickel foil or stainless steel foil.

At the one end of the anode 143 in a longitudinal direction is, similarly to the cathode 142, formed an anode lead 133 which is connected to the electrode by spot welding or ultrasonic welding. As a material for the anode lead 133, for example, copper Cu or nickel Ni may be used.

Components other than the gel electrolyte layer 145 are the same as those in the first embodiment, and therefore the gel electrolyte layer 145 will be described as follows.

The gel electrolyte layer 145 includes an electrolyte solution and a polymer compound which serves as a holder for holding the electrolyte solution, and the gel electrolyte layer is in the state of a gel. The gel electrolyte layer 145 is preferable because when it is used, a high ionic conductivity can be obtained and liquid leakage from the battery can be prevented. The compositions of the electrolyte solution (namely, the solvent liquid, the electrolyte salt and the additives) are the same as in the first embodiment.

Examples of the polymer compound may include polyacrylonitrile, polyvinylidene fluoride, copolymers of vinylidene fluoride and hexafluoropropylene, polytetrafluoroethylene, polyhexafluoropropylene, polyethyleneoxide, polypropyleneoxide, polyphosphazene, polysiloxane, polyvinyl acetate, polyvinyl alcohol, methyl polymethacrylate, polyacrylic acid, polymethacrylic acid, styrene-butadiene rubber, nitrile-butadiene rubber, polystyrene, and polycarbonate. From the viewpoint of the electrochemical stability, polyacrylonitrile, polyvinylidene fluoride, polyhexafluoropropylene and polyethyleneoxide are particularly preferable.

(2-2) Method for Producing Nonaqueous Electrolyte Secondary Battery

Next, a method for producing a nonaqueous electrolyte secondary battery using the cathode active material according to one embodiment will be described. First, each of a cathode 142 and an anode 143 is coated with a precursor solution including a solvent, an electrolyte salt, a polymer compound and a mixed solvent, and then, the mixed solvent is volatilized to form a gel electrolyte layer 145. A cathode lead 132 is previously attached to the end of a cathode current collector by welding, and at the same time, an anode lead 133 is also attached to the end of an anode current collector 143A by welding.

Subsequently, the cathode 142 and the anode 143, both on which the gel electrolyte layers 145 are formed, are laminated via a separator 144, and the resulting laminate is wound in a longitudinal direction to form a wound battery element 130.

Next, a covering material 137 composed of a laminate film is subjected to drawing to form a concave part 136. Then, the battery element 130 is inserted into the concave part 136, an unprocessed part of the covering material 137 is bent to the top part of the concave part 136, and the periphery of the concave part 136 is welded to seal, whereby a nonaqueous electrolyte secondary battery is produced.

EXAMPLES

Examples are provided below according to various embodiments without limitation for the subject matter associated with the present application.

Example 1

First, 20 parts by weight of composite oxide particles having an average composition of $Li_{1.03}CoO_{2.01}$, and an average particle size, measured by a laser scattering method, of 13 μm were dispersed by stirring in 300 parts by weight of pure water at 80° C. for 1 hour.

Subsequently, to the dispersion were added 1.60 parts by weight of a commercial reagent, nickel nitrate $Ni(NO_3)_2 \cdot 6H_2O$ and 1.65 parts by weight of a commercial reagent, manganese nitrate $Mn(NO_3)_2 \cdot 6H_2O$, then a 2N aqueous LiOH solution was added thereto over 30 minutes to adjust the pH to 13, and the dispersion by stirring was continued at 80° C. for further 3 hours, followed by cooling the resultant mixture.

Next, the dispersion system was washed by decantation, to which 0.1 part by weight of a commercial reagent, ammonium molybdate $(NH_4)_2MoO_4$ dissolved in 1.0 part by weight of pure water was added. Then, the mixture was washed by decantation, and finally was filtered, and the filtrate was dried at 120° C. to form a precursor.

Then, in order to adjust a lithium amount, 10 parts by weight of the resulting precursor sample was impregnated with 2 parts by weight of a 2N aqueous LiOH solution, which was uniformly mixed, and the mixture was dried to give a precursor for calcination. The temperature of the precursor for calcination was elevated at a rate of 5° C./minute to 950° C. under air stream in an electric furnace. It was kept at the same temperature for 5 hours, and then was cooled down at a temperature rate of 7° C./minute to 150° C. to give a cathode active material of Example 1.

Example 2

First, 20 parts by weight of the same composite oxide particles used in Example 1 were dispersed in 300 parts by weight of a 2N aqueous LiOH solution at 80° C. for 2 hours (this system had a pH of 14.2). Subsequently, 10 parts by weight of an aqueous solution was prepared by adding pure water to 1.60 parts by weight of a commercial reagent, nickel nitrate $Ni(NO_3)_2 \cdot 6H_2O$ and 1.65 parts by weight of a commercial reagent, manganese nitrate $Mn(NO_3)_2 \cdot 6H_2O$. The whole quantity, 10 parts by weight, of the aqueous solution was added to the dispersion obtained above over 2 hours, and dispersion by stirring was continued at 80° C. for further 1 hour, which was allowed to cool.

Next, the dispersion system was washed by decantation, to which 0.2 part by weight of a commercial reagent, sodium molybdate $Na_2MoO_4$ dissolved in 2.0 parts by weight of pure water was added. Then, the mixture was washed by decantation, and finally was filtered, and the filtrate was dried at 120° C. to form a precursor. The temperature of the resulting precursor was elevated to 950° C. at a rate of 5° C./minute under air stream in an electric furnace. It was kept at the same temperature for 5 hours, and then was cooled down at a temperature rate of 7° C./minute to 150° C. to give a cathode active material of Example 2.

Example 3

A cathode active material of Example 3 was produced in the same manner as in Example 2 except that 20 parts by weight of an aqueous solution was prepared by adding pure water to 3.20 parts by weight of a commercial reagent, nickel nitrate $Ni(NO_3)_2 \cdot 6H_2O$ and 3.30 parts by weight of a commercial reagent, manganese nitrate $Mn(NO_3)_2 \cdot 6H_2O$, and the whole quantity, 20 parts by weight, of the resulting aqueous solution was added over 3 hours; and that 0.1 part by weight of a commercial reagent, lithium molybdate $Li_2MoO_4$ was dissolved in 1.0 part by weight of pure water and the resulting aqueous solution was added.

Example 4

A cathode active material of Example 4 was produced in the same manner as in Example 2 except that 20 parts by weight of an aqueous solution was prepared by adding pure water to 3.20 parts by weight of a commercial reagent, nickel nitrate $Ni(NO_3)_2 \cdot 6H_2O$, 3.30 parts by weight of a commercial reagent, manganese nitrate $Mn(NO_3)_2 \cdot 6H_2O$, and a commercial reagent, aluminum nitrate $Al(NO_3)_3 \cdot 9H_2O$, and the whole quantity, 20 parts by weight, of the resulting aqueous solution was added over 3 hours; and that 0.1 part by weight of a commercial reagent, sodium molybdate $Na_2MoO_4$ was dissolved in 2.0 parts by weight of pure water, in which 0.05 part by weight of a commercial reagent, molybdic anhydride $MoO_3$ was dissolved, and the resulting solution was added.

Example 5

A cathode active material of Example 5 was produced in the same manner as in Example 2 except that 20 parts by weight of an aqueous solution was prepared by adding to pure water 3.20 parts by weight of a commercial reagent, nickel nitrate $Ni(NO_3)_2 \cdot 6H_2O$ alone without adding manganese nitrate $Mn(NO_3)_2 \cdot 6H_2O$, and the whole quantity, 20 parts by weight, of the resulting aqueous solution was added over 3 hours; and that 0.1 part by weight of a commercial reagent, lithium molybdate $Li_2MoO_4$ was dissolved in 1.0 part by weight of pure water and the aqueous solution was added.

Comparative Example 1

The same composite oxide particles as used in Example 1, which had an average composition of $Li_{1.03}CoO_{2.01}$, and an average particle size, measured by a laser scattering method, of 13 μm, were used as a cathode active material of Comparative Example 1.

Comparative Example 2

A cathode active material of Comparative Example 2 was produced in the same manner as in Example 1 except that 0.1 part by weight of the ammonium molybdate $(NH_4)_2MoO_4$ was not added.

Evaluation:

Using the cathode active materials produced in Examples 1 to 5 and Comparative Examples 1 and 2, secondary batteries shown in FIGS. 1 and 2 were produced. First, 86 wt % of the produced cathode active material powder, 10 wt % of graphite as a conductive agent, and 4 wt % of polyvinylidene fluoride as a binder were mixed, and the mixture was dispersed in a solvent, N-methyl-2-pyrrolidone (NMP). Then, the dispersion was coated on both sides of a cathode current collector 102A composed of a strip aluminum foil having a thickness of 20 μm, and the obtained collector was dried to be subjected to compression-molding by using a roller press to form a cathode mixture layer 102B, from which a cathode 102 was produced. At that time, the cathode active material powder was thoroughly pulverized with a kneader so as to pass through a sieve having an opening of 70 μm. A void ratio of the cathode mixture layer 102B was controlled to a volume ratio of 26%. Next, an aluminum cathode lead 113 was attached to the cathode current collector 102A.

Separately, 90 wt % of an artificial graphite powder as an anode active material and 10 wt % of polyvinylidene fluoride as a binder were mixed, and the mixture was dispersed in a solvent, N-methyl-2-pyrrolidone. Then, the dispersion was coated on both sides of an anode current collector 103A composed of a strip copper foil having a thickness of 10 μm, and the obtained collector was dried to be subjected to compression-molding by using a roller press to form an anode mixture layer 103B, from which an anode 103 was produced. Next, a nickel anode lead 114 was attached to the anode current collector 103A.

The thus obtained strip cathode 102 and strip anode 103 were wound in large number of turns via a porous polyolefin film as a separator 104, to produce a spirally wound electrode assembly 120. The wound electrode assembly 120 was housed in an iron battery can 101, and a pair of insulating plates 105 and 106 were placed on the top side and bottom side of the wound electrode assembly 120. Then, the cathode lead 113 was drawn out of the cathode current collector 102A, and welded to the safety valve mechanism 108, and similarly, the anode lead 114 was drawn out of the anode current collector 103A and welded to the bottom part of the battery can 101. Thereafter, an electrolyte solution was injected to the inside of the battery can 101, and the battery can 101 was crimped via a gasket 110 to fix the safety valve mechanism 108, the positive temperature coefficient element 109 and the battery lid 107, thereby obtaining a cylindrical secondary battery having an outer diameter of 18 mm and a height of 65 mm. As the electrolyte solution, a solution obtained by dissolving 1.0 mol/l of an electrolyte salt, $LiPF_6$ in a solvent of ethylene carbonate and diethyl carbonate (1:1 by volume).

The thus produced secondary batteries were subjected to charge and discharge at a temperature of 45°, thereby determining an initial capacity, which was a discharge capacity at the first cycle, and a discharge capacity maintenance rate, which was a ratio of a discharge capacity at the 200-th cycle to that of the first cycle.

The charge was conducted by performing constant current charge until a battery voltage reached 4.40 V with a constant current of 1000 mA, and then performing constant voltage charge until the total charging time with a constant volume of 4.40 V reached 2.5 hours. The discharge was conducted by performing constant current discharge until a battery voltage reached 2.75 V with a constant current of 800 mA. The measurement results are shown in Table 1.

TABLE 1

| | INITIAL CAPACITY (mAh) | DISCHARGE CAPACITY MAINTENANCE RATE (%) |
|---|---|---|
| Example 1 | 2420 | 85 |
| Example 2 | 2430 | 88 |
| Example 3 | 2450 | 89 |
| Example 4 | 2420 | 90 |
| Example 5 | 2440 | 83 |
| COMPARATIVE EXAMPLE 1 | 2440 | 34 |
| COMPARATIVE EXAMPLE 2 | 2450 | 81 |

As shown in Table 1, it is understood that the batteries using the cathode active materials obtained in Examples 1 to 5 had high capacities, and higher discharge capacity maintenance rates than those of the batteries using the cathode active materials obtained in Comparative Examples 1 and 2. In addition, as to the composition of nickel Ni and manganese Mn in the metal oxide, from the comparison of the results in Example 3 with those in Example 5 in the discharge capacity maintenance rate, it is understood that the coexistence of both the metal oxide having nickel Ni and the metal oxide having manganese Mn was better than the metal oxide having only nickel Ni, because the former had higher charge-discharge cycling characteristics.

Various modifications and applications can be made without departing from the scope of the present application. For example, the shapes thereof are not particularly limited, and cylindrical types, square types, coin types, button types, and the like may be used.

In the first embodiment, the nonaqueous electrolyte secondary battery has the electrolyte solution as the electrolyte, and in the second embodiment, the nonaqueous electrolyte secondary battery has the gel electrolyte as the electrolyte. However, the present application is not limited thereto.

For example, not only the electrolytes mentioned above, but also polymer solid electrolytes utilizing an ionically conductive polymer, inorganic solid electrolytes utilizing an ionically conductive inorganic material, and the like may be used as the electrolyte. Further, they may be used alone or as a mixture with another electrolyte. Examples of the polymer used in the polymer solid electrolyte may include polyether, polyester, polyphosphazene, and polysiloxane. Examples of the inorganic solid electrolyte may include ionically conductive ceramics, ionically conductive crystal, and ionically conductive glass.

Further, for example, the electrolyte solution in the nonaqueous electrolyte secondary battery is not particularly limited, and a conventional nonaqueous solvent system electrolyte solution and the like may be used. Of these, preferable examples of the nonaqueous electrolyte solution including an alkali metal salt in the secondary battery include propylene carbonate, ethylene carbonate, y-butyrolactone, N-methylpyrrolidone, acetonitrile, N,N-dimethylformamide, dimethylsulfoxide, tetrahydrofuran, 1,3-dioxolane, methyl formate, sulfolane, oxazolidone, thionyl chloride, 1,2-dimethoxyethane, diethylenecarbonate, derivatives thereof, and mixtures thereof. Preferable examples of the electrolyte contained in the electrolyte solution include alkali metals, particularly calcium halide, perchlorate, thiocyanogen salts, fluoroborates, fluorophosphates, arsenic fluoride, yttrium fluoride, and trifluoromethylsulfuric acid salts.

Next, fourth, fifth and sixth embodiments will be explained with reference to drawings. A cathode active material according to one embodiment has a coating layer which contains an oxide including lithium Li and an oxide(s) including at least one coating element of nickel Ni and manganese Mn on at least a part of a composite oxide particle, and a surface layer which contains an oxide including yttrium Y on at least a part of the coating layer.

First, the reason that the cathode active material has the above-mentioned configuration will be explained. Cathode active materials mainly containing lithium cobaltate $LiCoO_2$ have high charge voltage property and corresponding high energy density property, but their capacities remarkably lower by repeating charge and discharge cycle under a high capacity at a high charge voltage. The lowering is due to surface state of the cathode active material, and the necessity of a surface treatment of the cathode active material is pointed out.

Consequently, various surface treatments are proposed. From the viewpoints that a capacity per volume or weight is not lowered or lowering of a capacity is minimized, cathode active materials having high charge voltage property and corresponding high energy density property, as well as good charge-discharge cycling characteristics at a high charge voltage can be obtained by inhibiting the lowering of the capacity, or coating a material which contributes to inhibition of the lowering the capacity on the surface.

It has been found that it is possible to obtain cathode active materials having high charge voltage property and corresponding high energy density property, though they are lower a little, and good charge-discharge cycling characteristics of the high capacity under a high charge voltage condition. The cathode active materials are obtained by forming a coating layer which contains an oxide including lithium Li and an oxide(s) including at least one coating element of nickel Ni and manganese Mn on a cathode active material mainly containing lithium cobaltate $LiCoO_2$.

As a method for forming a coating layer on composite oxide particles, the following two methods may be proposed. In one method, a lithium Li compound, and a nickel Ni compound and/or a manganese Mn compound are pulverized with the composite oxide particles to give fine particles, and they are dry-mixed, applied to each other, and calcined to form a coating layer which contains an oxide including the lithium Li and an oxide(s) including the coating element(s) of at least one of the nickel Ni and the manganese Mn on the surface of the composite oxide particles. In the other method, a lithium Li compound, and a nickel Ni compound and/or a manganese Mn compound are dissolved in or mixed with a solvent, and subjected to wet-application and calcination to form a coating layer which contains an oxide including the lithium Li and an oxide(s) including the coating element(s) of at least one of the nickel Ni and the manganese Mn on the surface of the composite oxide particles. However, these methods give the results that it may be impossible to obtain a high uniform coating.

It has been found that a coating layer is formed by applying a hydroxide(s) of nickel Ni and/or manganese Mn and dehydrating the resulting product with heating to give a coating layer having high uniformity. According to this application treatment, a nickel Ni compound and/or a manganese Mn compound are/is dissolved in a solvent system mainly containing water, then composite oxide particles are dispersed in the solvent system, and a base is added to the dispersion system, or the like to increase the basicity of the dispersion system, whereby hydroxide(s) including the nickel Ni and/or the manganese Mn are precipitated on the surface of the composite oxide particles.

The composite oxide particles to which the hydroxide(s) including nickel Ni and/or manganese Mn are/is applied by the application treatment are dehydrated with heating to form a coating layer on the composite oxide particles. This makes it possible to improve uniformity of the coating on the composite oxide particles. However, it has been further found that the sintering between the particles tends to easily progress in the step of calcinating the precursor.

When the sintering between the particles advances too much, the following problems are raised. When a cathode is formed, it is required to increase an input of mechanical energy for use in cracking of the particles, which is conducted for uniformly mixing the particles with a binder and a conductive agent, carbon particles. Consequently, the cathode active material including the composite oxide particles having the coating layer is damaged or broken, resulting in an increased number of the defective particles in totality.

The failure or breakdown appears as breaking of a connecting part between the sintered particles, formation of fissure in the particles, fracture of the particles, peeling-off of the coating layer, and the like. In particular, the composite oxide particles having the coating layer tend to have an uneven surface rather than a smooth surface, as compared with the cathode active material mainly containing lithium cobaltate $LiCoO_2$. From this constitution, when an external force is applied to them, probably, the particles hardly slide on each other, and the external force is easily concentrated on a spot, whereby the failure or the breakdown easily occurs.

As a result, a surface where the coating layer is not formed is exposed. In other words, the surface having no coating layer, which does not function for improving the charge-discharge cycling characteristics, and an active newborn surface are exposed. This deteriorates the charge-discharge cycling characteristics under a high charge voltage condition at a high capacity. As is known well, the exposed surface is active and has a high surface energy. Such a surface has, accordingly, very high activity in decomposition reaction of the electrolyte solution and elution activity, as compared with surfaces formed in a usual calcination.

In order to improve the cathode functions and the production process, a study was conducted based on the sintering between the particles. As a result, it's been found that when a composite oxide particle whose surface has been applied with a hydroxide(s) including nickel Ni and/or manganese Mn, is further applied with a hydroxide including yttrium Y, the progress of sintering can be improved. It has also found that the failure or breakdown of the particles can be reduced, accordingly, as well as that deterioration of functions can be improved by an effect for improving a cathode surface by the application.

Next, a composite oxide, a coating layer, and a surface layer, which form a cathode active material according to one embodiment, will be described.

[Composite Oxide]

The composite oxide particle has, for example, an average composition represented by the formula 1. The composite oxide particle has the average composition represented by the formula 1, and thus have a high capacity and a high discharge voltage.

$$Li_{(1+x)}Co_{(1-y)}M_yO_{(2-z)} \qquad \text{(formula 1)}$$

wherein M is at least one element selected from the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; and x, y and z satisfy the relationships of $-0.10 \leq x \leq 0.01$, $0 \leq y < 0.50$, and $-0.10 \leq z \leq 0.20$.

In the formula 1, x is in the range of $-0.10 \leq x \leq 0.10$, preferably $-0.08 \leq x \leq 0.08$, and more preferably $-0.06 \leq x \leq 0.06$. When the value of x is less than the above-mentioned range, the discharge capacity may lower. When the value of x is more than the above-mentioned range, lithium may diffuse out of the particles, and the basicity control in a subsequent treatment step may be impaired, finally resulting in a harmful influence on promotion of gelation while kneading the cathode paste.

y is in the range of $0 \leq y < 0.50$, preferably $0 \leq y \leq 0.40$, and more preferably $0 \leq y \leq 0.30$. When the value of y is more than the above-mentioned range, the high charge voltage property possessed by $LiCoO_2$, and corresponding high energy density property may be impaired.

z is in the range of $-0.10 \leq z \leq 0.20$, preferably $-0.08 \leq z \leq 0.18$, and more preferably $-0.06 \leq z \leq 0.16$. When the value of z is less than or more than the above-mentioned range, it tends to lower the discharge capacity.

Although materials which are available as a cathode active material can be usually used as a starting material of the composite oxide particles, in some cases, particles obtained by cracking secondary particles with a ball mill, a kneader or the like may be used.

[Coating Layer]

The coating layer is formed on at least a part of the composite oxide particle, and contains an oxide including lithium Li and an oxide(s) including at least one coating element of nickel Ni and manganese Mn. Formation of such a coating layer gives high charge voltage property and corresponding high energy density property, and also can improve charge-discharge cycling characteristics under a high charge voltage condition at a high capacity.

A composition ratio of nickel Ni and manganese Mn in the coating layer is preferably in the range of 100:0 to 30:70, more preferably 100:0 to 40:60. As the amount of the manganese Mn increases, occlusive property of lithium Li lowers, finally resulting in lowering of the capacity of the cathode active material and increasing an electric resistance when using it in a battery. The above-mentioned range of the composition ratio of the nickel Ni and the manganese Mn is a range showing better effectiveness, in other words, in this range, the progress of the sintering between the particles is inhibited, in the process of calcinating a precursor to which lithium Li is added.

It is possible to substitute the nickel Ni and the manganese Mn in the oxides in the coating layer with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

The substitution makes it possible to improve the stability of the cathode active material and the diffusibility of the lithium ion. An amount of the selected metal element substituted is not more than 40 mol %, of the total amount of the nickel Ni and the manganese Mn in the oxides in the coating layer, preferably not more than 30 mol %, and more preferably not more than 20 mol %. If the amount of the selected metal element substituted is more than the above-mentioned range, the occlusive property of the lithium Li and the capacity of the cathode active material may lower.

The amount of the coating layer is 0.5 wt % to 50 wt % of the composite oxide particles, preferably 1.0 wt % to 40 wt %, and more preferably 2.0 wt % to 35 wt %. This is because when the amount of the coating layer is more than the above-mentioned range, the capacity of the cathode active material lowers; while when the amount of the coating layer is less than the above-mentioned range, the stability of the cathode active material lowers.

[Surface Layer]

The surface layer is formed on at least a part of the coating layer, and contains an oxide including yttrium Y. Formation of the surface layer can inhibit the binding between the particles. Also, the surface layer which contains the oxide including yttrium Y probably contributes to the effects of the above-mentioned coating layer. Elution activity of the surface is further inhibited by the surface layer, as compared with the case where only the coating layer is formed.

It is possible to substitute not more than 20 mol % of yttrium Y, % being based on the total amount of the yttrium, in the oxide in the surface layer with at least one metal element selected from the group consisting of magnesium Mg, boron B, titanium Ti, vanadium V, chromium Cr, manganese Mn, iron Fe, cobalt Co, aluminum Al, nickel Ni, copper Cu, zinc Zn, molybdenum Mo, tin Sn, calcium Ca, strontium Sr, tungsten W, and zirconium Zr. The substitution leads to improvement of the stability of the cathode active material and the diffusibility of the lithium ion.

The amount of the selected metal element substituted is not more than 20 mol % based on the total amount of the yttrium Y in the oxide in the surface layer, as mentioned above, preferably not more than 15 mol %, and more preferably not more than 10 mol %. When the amount of the selected metal element substituted is more than the above-mentioned range, it tends to lower an effect for preventing sintering caused by application of the surface layer and therefore an effect for increasing charge-discharge cycling characteristics.

An amount of the surface layer is $1.0 \times 10^{-5}$ mole to $1.0 \times 10^{-2}$ mole of yttrium ion per $m^2$ of the applied surface, the amount being considered as an amount of yttrium Y applied.

The amount is preferably from $3.0 \times 10^{-5}$ mole to $5.0 \times 10^{-3}$ mole, and more preferably from $1.0 \times 10^{-4}$ mole to $1.0 \times 10^{-3}$ mole. When the amount of the surface layer is more than the above-mentioned range, diffusion resistance of lithium ion increases, and capacity of a final product of the application, a cathode active material, lowers. On the other hand, when the amount is less than the above-mentioned range, an effect for preventing sintering and therefore an effect for improving charge-discharge cycling characteristics tend to lower.

An average particle size of the cathode active material is from 2.0 μm to 50 μm. When the average particle size is less than 2.0 μm, peeling-off occurs by press during the production of the cathode, and it is required to increase amounts of a conductive agent and a binder to be added because the surface area of the active material is increased, and therefore, it tends to lower energy density per unit weight. On the other hand, when the average particle size is more than 50 μm, the particles tend to pass through a separator, thus resulting in a short circuit.

[Method for Producing Cathode Active Material]

Next, a method for producing a cathode active material according to one embodiment will be described. The method for producing a cathode active material according to one embodiment is divided into two steps. In a first step, a layer which contains a hydroxide(s) including nickel Ni and/or manganese Mn on at least a part of a composite oxide particle, and then a hydroxide including yttrium Y is formed on at least a part of the composite oxide particle. In a second step, the composite oxide particle is heated after forming the hydroxide including yttrium Y to form, on at least a part of the composite oxide particle, a coating layer which contains an oxide including lithium Li and an oxide(s) including at least one coating element of nickel Ni and manganese Mn, and a surface layer which contains an oxide including yttrium Y.

(First Step)

In the first step, application treatment of a hydroxide(s) including nickel Ni and/or manganese Mn, and application treatment of a hydroxide including yttrium Y are performed. According to the first step, for example, first, composite oxide particles are dispersed in a solvent system mainly containing water in which a nickel Ni compound and/or a manganese Mn compound are/is dissolved, and a base is added to the dispersion system, or the like to increase the basicity of the dispersion system, whereby a hydroxide(s) including nickel Ni and/or manganese Mn are/is precipitated on the surface of the composite oxide particles. Also, composite oxide particles may be dispersed in a basic solvent mainly containing water, and then a nickel Ni compound and/or a manganese Mn compound may be added to the aqueous solution, to thereby precipitate a hydroxide(s) including the nickel Ni and/or the manganese Mn.

Examples of the starting material of the nickel Ni compound may include inorganic compounds such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogen sulfide, nickel nitride, nickel nitrite, nickel phosphate, and nickel thiocyanate; and organic compounds such as nickel oxalate and nickel acetate. They may be used as they are, or may be treated with an acid or the like to be converted into compounds capable of dissolving in a solvent system, as occasion demands.

Examples of the starting material of the manganese Mn compound may include inorganic compounds such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrosulfide, manganese nitrate, manganese hydrogen sulfate, manganese thiocyanate, manganese nitrite, manganese phosphate, manganese dihydrogen phosphate, and manganese hydrogen carbonate; and organic compounds such as manganese oxalate, and manganese acetate. They may be used as they are, or may be treated with an acid or the like to be converted into compounds capable of dissolving in a solvent system, as occasion demands.

Next, the hydroxide including yttrium Y is applied to the surface of the composite oxide particles coated with the hydroxide(s) including the nickel Ni and/or the manganese Mn. The application of the hydroxide including the yttrium Y may be performed in the same manner as the application of the hydroxide(s) including the nickel Ni and/or the manganese Mn. That is, the composite oxide particles coated with the hydroxide(s) including the nickel Ni and/or the manganese Mn are dispersed in a solvent system mainly containing water in which a yttrium Y compound is dissolved, and a base is added to the dispersion system, or the like to increase basicity of the dispersion system, whereby a hydroxide including the yttrium is precipitated. Also, the composite oxide particles coated with the hydroxide(s) including the nickel Ni and/or the manganese Mn may be dispersed in a basic solvent mainly containing water, to which a yttrium Y compound may be added to precipitate its hydroxide.

Examples of the starting material of the yttrium Y compound may include inorganic compounds such as yttrium hydroxide, yttrium nitrate, yttrium fluoride, yttrium chloride, yttrium bromide, yttrium iodide, yttrium perchlorate, yttrium oxide, yttrium sulfate, and yttrium carbonate; and organic compounds such as yttrium oxalate and yttrium acetate. They may be used as they are, or may be treated with an acid or the like to be converted into compounds capable of dissolving in the solvent system, as occasion demands.

In the first step, a pH of the above-mentioned solvent system mainly containing water is not less than pH 12, preferably not less than pH 13, and more preferably not less than pH 14. The higher the pH of the solvent system mainly containing water, the better the uniformity of the application of the hydroxide(s) including the nickel Ni and/or the manganese Mn and the hydroxide including yttrium Y as well as the higher the reaction accuracy. Thus, the productivity is improved due to the shortened treatment time, and the quality is improved. The pH of the solvent system mainly containing water is decided depending on the cost of an alkali to be used, and the like.

In the first step, a temperature of the dispersion system during treatment is not less than 40° C., preferably not less than 60° C., AND more preferably not less than 80° C. The higher the temperature of the dispersion system during treatment, the better the uniformity of the application of the hydroxide(s) including the nickel Ni and/or the manganese Mn and the hydroxide including yttrium Y as well as the higher the reaction speed. Thus, the productivity is improved due to the shortened treatment time, and the quality is improved. A treatment conducted at 100° C., using an autoclave can be preferred from the viewpoint of the improvement of the uniformity of the application and the productivity due to the shortened treatment time caused by improvement in the faster reaction speed, although it is decided depending on the balance between the cost of the apparatus and the productivity.

In addition, in the first step, for example, it is possible to form the hydroxide(s) including the nickel Ni and/or the manganese Mn on the surface of the composite oxide particles in the solvent system mainly containing water, then to remove the particles from the solvent system mainly containing water, and apply the hydroxide including yttrium Y thereto, but the present application is not limited thereto. For example, it is also possible to form the hydroxide(s) including the nickel Ni and/or the manganese Mn on the surface of the composite oxides, and then add the yttrium compound to the solvent system to apply the hydroxide including yttrium Y to the particles, without separating the particles from the solvent system mainly containing water.

Further, in the first step, a pH of the solvent system mainly containing water can be adjusted by dissolving an alkali in the solvent system mainly containing water. Examples of the alkali may include lithium hydroxide, sodium hydroxide, potassium hydroxide, and mixtures thereof. Although the adjustment of the pH may be performed by appropriately using the above-mentioned alkali, it is preferable to use lithium hydroxide, from the viewpoint of the purity and the performance of the resulting cathode active material according to one embodiment. The advantage of using lithium hydroxide is that when the composite oxide particles, which have been subjected to the application treatment, are taken out of the solvent system mainly containing water, the amount of the lithium in the cathode active material can be controlled by controlling the application mass of the solvent mainly containing water.

(Second Step)

In the second step, the composite oxide particles subjected to the application treatment in the first step are separated from the solvent system mainly containing water, and then, the obtained particles are heated to dehydrate the hydroxides to form a coating layer and a surface layer. It is preferable that the heat treatment is performed in an oxidative atmosphere including air or pure oxygen at a temperature of about 300° C. to 1000° C. In this case, the hydroxide(s) including the nickel Ni and/or the manganese Mn are/is coated with the hydroxide including yttrium Y, which makes it possible to inhibit the sintering between the particles and to inhibit the binding between the particles.

After the composite oxide particles, which have been subjected to the application treatment in the first step, are separated from the solvent system, if necessary, the particles may be impregnated with an aqueous solution of a lithium compound in order to adjust the amount of the lithium, followed by heating the resulting particles.

Examples of the lithium compound may include inorganic compounds such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrosulfide, lithium sulfate, lithium hydrogensulfate, lithium nitride, lithium azide, lithium nitrite, lithium phosphate, lithium dihydrogen phosphate, and lithium hydrogencarbonate; and organic compounds such as methyl lithium, vinyl lithium, isopropyl lithium, butyl lithium, phenyl lithium, lithium oxalate, and lithium acetate.

After the calcination, the particle size may be adjusted by using light pulverization, classification, or the like, as occasion demands.

Next, a nonaqueous electrolyte secondary battery using the cathode active material according to the embodiment mentioned above will be described.

Figure 5:
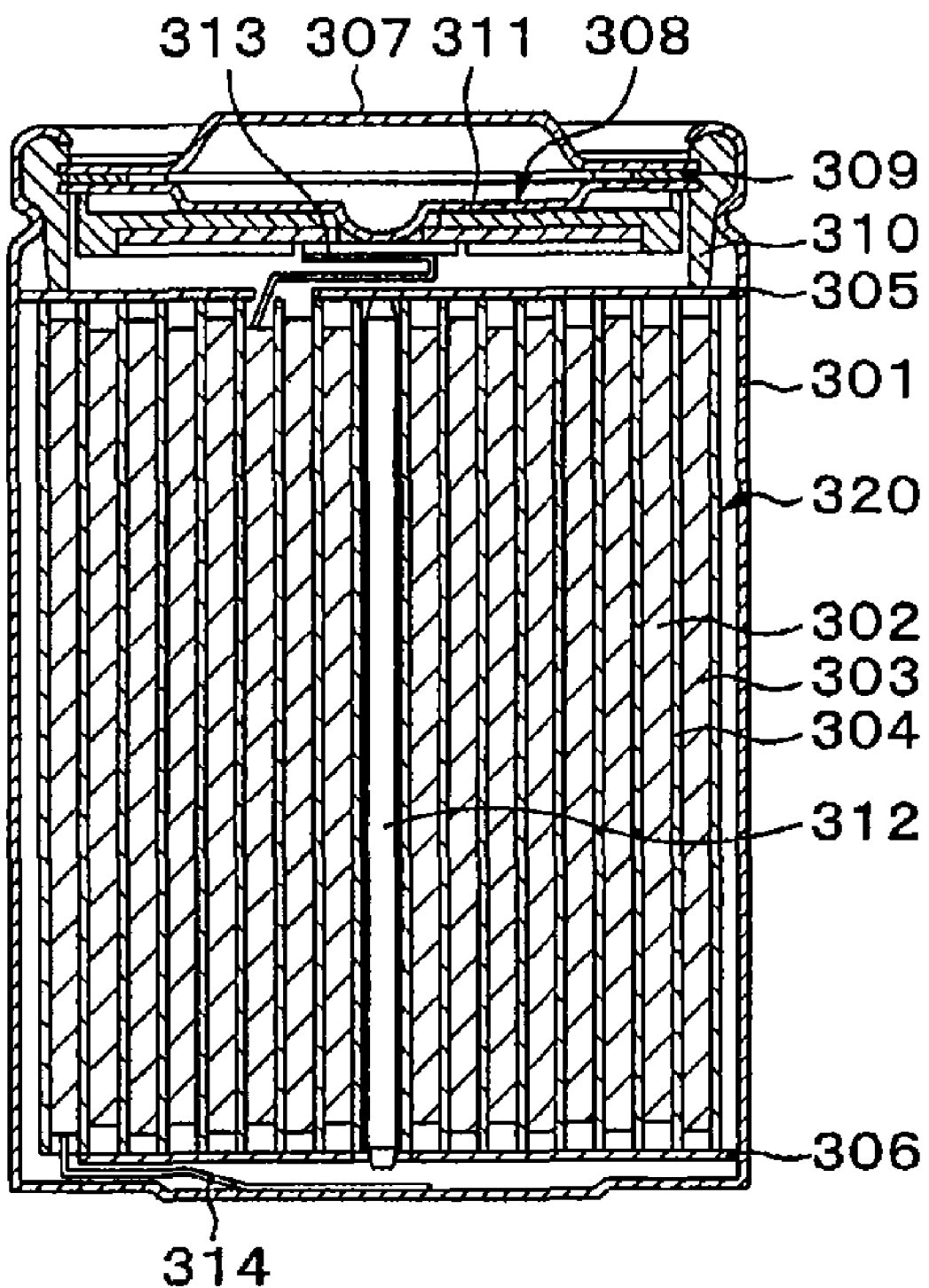
FIG. 5 is a schematic cross-sectional view showing a third embodiment which is a nonaqueous electrolyte secondary battery using a cathode active material according to an embodiment.

(3) Third Embodiment of Nonaqueous Electrolyte Secondary Battery (3-1) Configuration of Nonaqueous Electrolyte Secondary Battery FIG. 5 shows a cross-sectional structure of a nonaqueous electrolyte secondary battery using the cathode active material according to one embodiment.

The secondary battery has an open-circuit voltage of, for example, not less than 4.25 V and not more than 4.65 V per a pair of cathode and anode under a full charge state.

The secondary battery is a so-called cylindrical battery, and has a wound electrode assembly 320 in a battery can 301 which is a substantially hollow cylinder. In the wound electrode assembly 320, a strip cathode 302 and a strip anode 303 are wound via a separator 304.

The battery can 301 is composed of, for example, iron Fe plated with nickel Ni, whose one end is closed and the other end is open. Inside of the battery can 301, a pair of insulating plates 305 and 306 are placed perpendicularly to a winding circumference so as to sandwich the wound electrode assembly 320 therebetween.

To the open end of the battery can 301 are attached a battery lid 307, and a safety valve mechanism 308 and a positive temperature coefficient element (PTC element) 309, which are formed at the inside of the battery lid 307, by crimping via a gasket 310. The inside of the battery can 301 is sealed. The battery lid 307 is made of, for example, the same material as the battery can 301. The safety valve mechanism 308 is electrically connected to the battery lid 307 through the positive temperature coefficient element 309. When the internal pressure of the battery becomes not less than a certain value by an internal short-circuit or heat from the outside, then a disc plate 311 is reversed to cut the electric connection between the battery lid 307 and the wound electrode assembly 320. When a temperature is raised, the positive temperature coefficient element 309 controls an electric current by increased electrical resistivity, thereby preventing an unusual amount of heat caused by the high electric current. The gasket 310 is composed of, for example, an insulating material, whose surface is coated with asphalt.

The wound electrode assembly 320 has, for example, a center pin 312 around which the electrodes are wound. To the cathode 302 in the wound electrode assembly 320 is connected a cathode lead 313 made of, for example, aluminum Al or the like, and to the anode 303 is connected an anode lead 314 made of, for example, nickel Ni or the like. The cathode lead 313 is electrically connected to the battery lid 307 by being welded to the safety valve mechanism 308, and the anode lead 314 is electrically connected to the battery can 301 by welding.

[Cathode]

Figure 6:
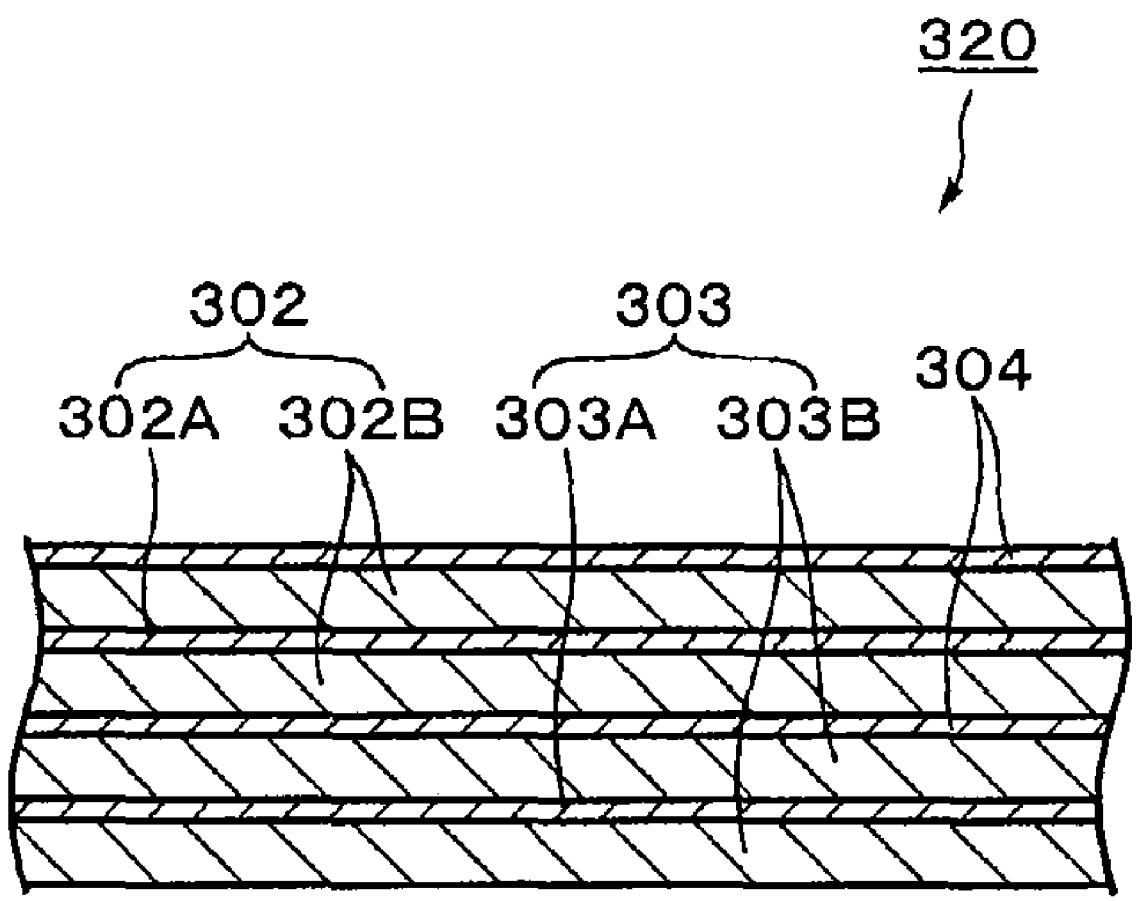
FIG. 6 is an enlarged cross-sectional view showing a part of a wound electrode assembly shown in FIG. 5.

FIG. 6 is an enlarged view showing a part of the wound electrode assembly 320 shown in FIG. 5. As shown in FIG. 6, the cathode 302 has, for example, a cathode current collector 302A having a pair of faces facing to each other, and cathode mixture layers 302B formed on both sides of the cathode current collector 302A. The cathode mixture layer 302B may be formed in an area of only one side of the cathode current collector 302A. The cathode current collector 302A is composed of, for example, a metal foil such as aluminum Al foil. The cathode mixture layer 302B contains, for example, a cathode active material, and may contain, if necessary, a conductive agent such as graphite and a binder such as polyvinylidene fluoride. As the cathode active material, the cathode active material according to one embodiment mentioned above may be used.

[Anode]

As shown in FIG. 6, the anode 303 has, for example, an anode current collector 303A having a pair of faces facing to each other, and anode mixture layers 303B formed on both sides of the anode current collector 303A. The anode mixture layer 303B may be formed in an area of only one side of the anode current collector 303A. The anode current collector 303A is composed of, for example, a metal foil such as copper Cu foil. The anode mixture layer 303B contains, for example, an anode active material, and may contain, if necessary, a binder such as polyvinylidene fluoride.

The anode active material includes an anode material which can absorb and release lithium Li (hereinafter, sometimes, referred to as a "anode material capable of absorbing/releasing lithium Li"). Example of the anode material capable of absorbing/releasing lithium Li may include carbon materials, metal compounds, oxides, sulfides, lithium nitrides such as $LiN_3$, lithium metals, metals forming an alloy together with lithium, and polymer materials.

Examples of the carbon material may include low-graphitized carbons, easily-graphitized carbons, graphite, pyrocarbons, cokes, glassy carbons, organic polymer compound sintered bodies, carbon fibers, and activated carbon. Of these, the cokes may include pitch coke, needle coke, and petroleum coke. The organic polymer compound sintered bodies refer to materials obtained by calcinating a polymer material such as a phenol plastic or a furan resin at an appropriate temperature to carbonize it, some of which are classified into low-graphitized carbons or easily-graphitized carbons. Examples of the polymer material may include polyacetylene and polypyrrole.

Among such anode materials capable of absorbing/releasing lithium Li, materials having a charge and discharge voltage near to that of lithium metal are preferable. This is because the lower the charge and discharge voltage of the anode 303, the battery more easily has a higher energy density. Of these, the carbon materials are preferable because they have only a small change of their crystal structures on charge and discharge, and thus, good cycling characteristics as well as a high charge and discharge capacity can be obtained. The graphite is particularly preferable because it can give large electrochemical equivalent and a high energy density. The low-graphitized carbon is also preferable because it can give good cycling characteristics.

Further, the anode material capable of absorbing/releasing lithium Li may include lithium elemental metal, metal elements and semi-metal elements capable of forming an alloy together with lithium Li, alloys and compounds including such an element, and the like. They are preferable because they can give a high energy density. In particular, it is more preferable to use them together with the carbon material because, in such a case, good cycling characteristics as well as a high energy density can be obtained. The alloy used herein includes, in addition to alloys including two or more metal elements, alloys including one or more metal elements and one or more semi-metal elements. The alloy may be in the state of a solid solution, eutectic crystal (eutectic mixture), intermetallic compound, and mixture of thereof.

Examples of the metal element and the semi-metal element may include tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, and hafnium Hf. Examples of the above-mentioned alloy and compound may include materials having the chemical formula: $Ma_sMb_tLi_u$ and materials having the chemical formula: $Ma_pMc_qMd_r$. In the chemical formulas, Ma denotes at least one element of metal elements and semi-metal elements capable of forming an alloy together with lithium; Mb denotes at least one element of metal elements and semi-metal elements other than lithium and Ma; Mc denotes at least one element of non-metal elements; Md denotes at least one element of metal elements and semi-metal elements other than Ma; and s, t, u, p, q and r satisfy $s>0$, $t\geq 0$, $u\geq 0$, $p>0$, $q>0$, and $r\geq 0$.

Of these, metal elements and semi-metal elements of Group IVB Short Periodic Table, and alloys and compounds including such an element are preferable, and silicon Si, tin Sn, and alloys and compounds including Si and/or Sn are particularly preferable. They may be crystals or amorphous.

In addition, inorganic compounds including no lithium Li such as $MnO_2$, $V_2O_5$, $V_6O_{13}$, NiS, and MoS may be used in either cathode or anode.

[Electrolyte Solution]

As the electrolyte solution, a nonaqueous electrolyte solution obtained by dissolving an electrolyte salt in a nonaqueous solvent may be used. Preferable nonaqueous solvent may be, for example, solvents including at least one of ethylene carbonate and propylene carbonate because they can improve cycling characteristics. It is particularly preferable to contain a mixture of ethylene carbonate and propylene carbonate in the electrolyte because the cycling characteristics can further be improved. Nonaqueous solvents preferably contain at least one ester selected from chain carbonic acid esters such as diethyl carbonate, dimethyl carbonate, ethyl methyl carbonate, and methyl propyl carbonate, because they can further improve cycling characteristics.

Nonaqueous solvents containing at least one of 2,4-difluoroanisole and vinylene carbonate are also preferable because the 2,4-difluoro anisole can improve discharge capacity and the vinylene carbonate can improve cycling characteristics. Nonaqueous solvents containing a mixture thereof are more preferable because both of the discharge capacity and the cycling characteristics can be improved.

The nonaqueous solvent may further contain at least one compound of butylene carbonate, γ-butyrolactone, γ-valerolactone, compounds thereof whose hydroxyl group(s) is/are all or partially substituted with a fluorine-containing group(s), 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropyl nitrile, N,N-dimethylformamide, N-methylpyrrolidinone, N-methyloxazolidinone, N,N-dimethyl imidazolidinone, nitromethane, nitroethane, sulfolane, dimethylsulfoxide, and trimethyl phosphate.

In some cases, the refersibility of an electrode reaction can be improved by using the material included in the above-mentioned nonaqueous solvents, whose hydroxyl group(s) all or partially is/are substituted with fluorine atom, depending on an electrode to be combined. These materials may be appropriately used.

Suitable examples of the lithium salt as the electrolyte salt may include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2(ox)$ lithium difluoro (oxalato) borate, LiBOB, and LiBr. They may be used alone or as a mixture of thereof. Of these, $LiPF_6$ is preferable because it can give high ionic conductivity and improve the cycling characteristics.

[Separator]

Now, a separator material which can be used in the nonaqueous electrolyte secondary battery using the cathode active material according to one embodiment will be described. As the separator material, materials which have been used for conventional batteries can be used. Among them, it is particularly preferable to use microporous polyolefin films, which have good effect for preventing short-circuit and can improve stability of the battery by shutdown effect. For example, microporous films made of polyethylene resin or polypropylene resin are preferable.

As the separator material, it is also preferable to use laminates or mixtures of polyethylene having a lower shutdown temperature and polypropylene having high acid resistance, from the viewpoint that shutdown performance and floating property are well-balanced.

(3-2) Method for Producing Nonaqueous Electrolyte Secondary Battery

Next, a method for producing a nonaqueous electrolyte secondary battery will be described. The method will be described, referring to a cylindrical nonaqueous electrolyte secondary battery as one example.

A cathode 302 is produced as follows. First, for example, a cathode active material, a conductive agent and a binder are mixed to prepare a cathode mixture, and then, the resulting cathode mixture is dispersed in a solvent such as N-methyl-2-pyrrolidone to give a slurry of the cathode mixture.

Subsequently, the slurry of the cathode mixture is coated on a cathode current collector 302A and the solvent is dried, and then, compression-molding is performed using a roller press or the like to form a cathode mixture layer 302B, from which a cathode 302 is formed.

An anode 303 is produced as follows. First, for example, an anode active material and a binder are mixed to prepare an anode mixture, and then, the resulting anode mixture is dispersed in a solvent such as N-methyl-2-pyrrolidone to give a slurry of the anode mixture.

Subsequently, the slurry of the anode mixture is coated on an anode current collector 303A and the solvent is dried, and then, compression-molding is performed using a roll press or the like to form an anode mixture layer 303B, from which an anode 303 is formed.

Next, a cathode lead 313 is attached to the cathode current collector 302A by, for example, welding, and an anode lead 314 is also attached to the anode current collector 303A by welding or the like. Then, the cathode 302 and the anode 303 are wound via a separator 304, and the tip end of the cathode lead 313 is welded to a safety valve mechanism 308 while the tip end of the anode lead 314 is welded to the battery can 301. Then, the wound cathode 302 and anode 303 are sandwiched between a pair of insulating plates 305 and 306, which is housed in the battery can 301.

Then, an electrolyte solution is injected into the battery can 301, whereby the separator 304 is impregnated with the electrolyte solution. Subsequently, a battery lid 307, the safety valve mechanism 308 and a positive temperature coefficient element 309 are crimped at the open end of the battery can 301 via a gasket 310 to fix them to produce a nonaqueous electrolyte secondary battery.

Figure 7:
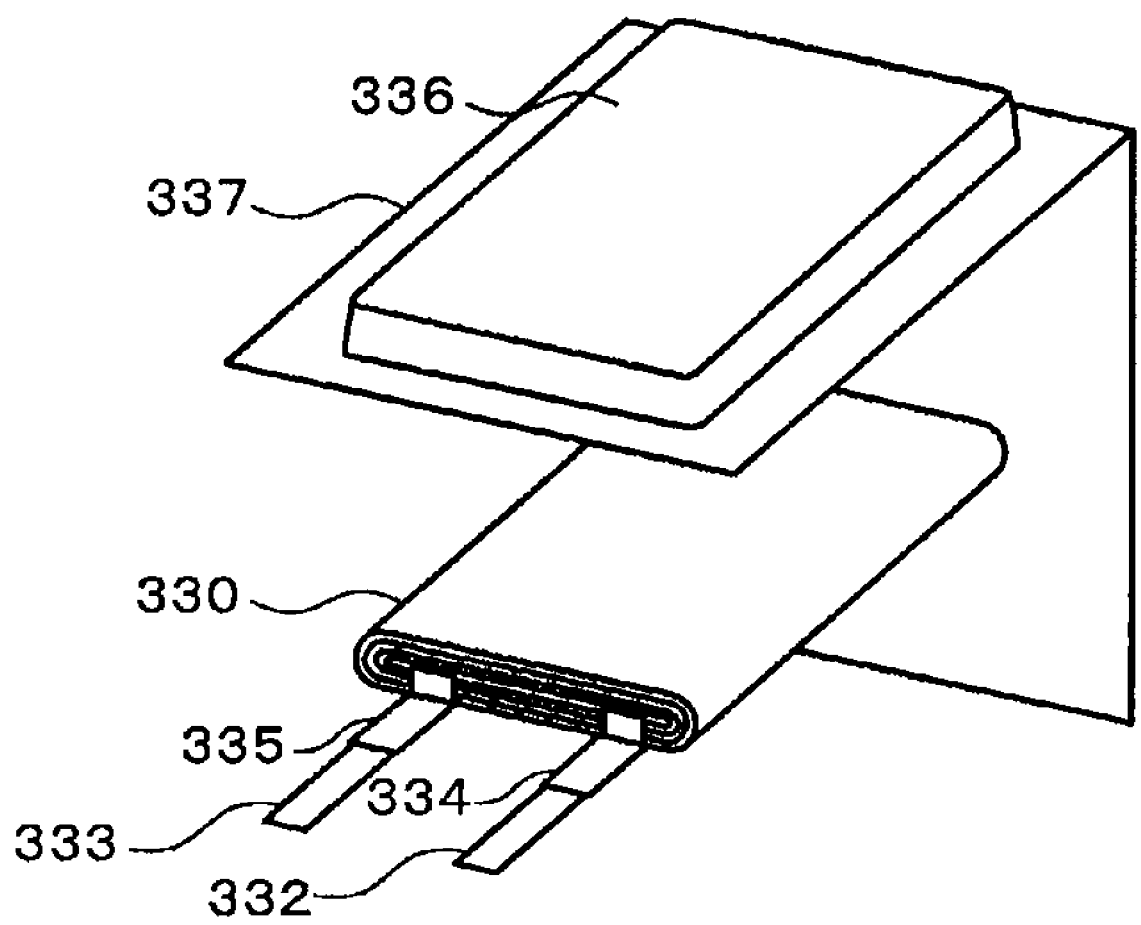
FIG. 7 is a schematic view showing a fourth embodiment which is a nonaqueous electrolyte secondary battery using a cathode active material according to an embodiment.

(4) Fourth Embodiment of Nonaqueous Electrolyte Secondary Battery (4-1) Configuration of Nonaqueous Electrolyte Secondary Battery FIG. 7 shows a structure of a nonaqueous electrolyte secondary battery using the cathode active material according to one embodiment. As shown in FIG. 7, the nonaqueous electrolyte secondary battery has a structure in which a battery element 330 is housed in a covering material 337 made of a moisture-proof laminate film, and the periphery of the battery element 330 is welded to seal. The battery element 330 has a cathode lead 332 and an anode lead 333. These leads are sandwiched with the covering material 337 and drawn to the outside. Both sides of the cathode lead 332 and the anode lead 333 are coated with resin pieces 334 and resin pieces 335, respectively, in order to improve adhesive property to the covering material 337.

[Covering Material]

The covering material 337 has a laminate structure obtained by sequentially laminating, for example, an adhesive layer, a metal layer, and a surface-protecting layer. The adhesive layer is composed of a polymeric film, and examples of the material forming the polymeric film may include polypropylene (PP), polyethylene (PE), cast polypropylene (CPP), linear low density polyethylene (LLDPE), and low density polyethylene (LDPE). The metal layer is composed of a metal foil, and examples of the material forming the metal foil may include aluminum Al. As the material for the metal foil, metals other than aluminum Al may be used. Examples of the material used for the surface-protecting layer may include nylon Ny and polyethylene terephthalate (PET). The surface of the adhesive layer faces the battery element 330.

[Battery Element]

Figure 8:
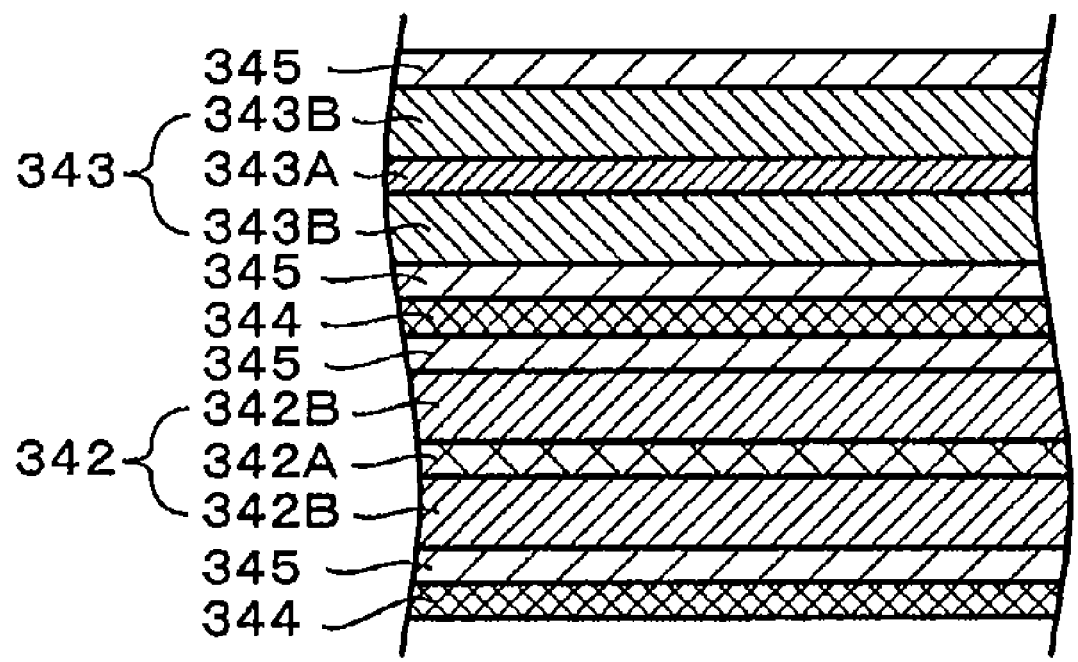
FIG. 8 is an enlarged cross-section showing a part of a battery element shown in FIG. 7.

The battery element 330 is, for example as shown in FIG. 8, a wound battery element 330 wherein a strip anode 343 having gel electrolyte layers 345 formed on both sides thereof, a separator 344, a strip cathode 342 having gel electrolyte layers 345 formed on both sides thereof, and a separator 344 are laminated, and the laminate is wound in a longitudinal direction.

The cathode 342 is composed of a strip cathode current collector 342A, and cathode mixture layers 342B formed on both sides of the cathode current collector 342A. The cathode current collector 342A is a metal foil made of, for example, aluminum Al.

At one end of the cathode 342 in a longitudinal direction is formed a cathode lead 332 which is connected to the electrode by spot welding or ultrasonic welding. As a material for the cathode lead 332, metals such as aluminum may be used.

The anode 343 is composed of a strip anode current collector 343A, and anode mixture layers 343B formed on both sides of the anode current collector 343A. The anode current collector 343A is composed of a metal foil such as copper Cu foil, nickel foil or stainless steel foil.

At the one end of the anode 343 in a longitudinal direction is, similarly to the cathode 342, formed an anode lead 333 which is connected to the electrode by spot welding or ultrasonic welding. For example, copper Cu, nickel Ni and the like may be used as a material for the anode lead 333.

Components other than the gel electrolyte layer 345 are the same as those in the first embodiment, and therefore, the gel electrolyte layer 345 will be described as follows.

The gel electrolyte layer 345 includes an electrolyte solution and a polymer compound which serves as a holder for holding the electrolyte solution, and the gel electrolyte layer 345 is in the state of a gel. The gel electrolyte layer 345 is preferable because when it is used, a high ionic conductivity can be obtained and liquid leakage from the battery can be prevented. The compositions of the electrolyte solution (namely, the solvent liquid, the electrolyte salt and the additives) are the same as in the first embodiment.

Examples of the polymer compound may include polyacrylonitrile, polyvinylidene fluoride, copolymers of vinylidene fluoride and hexafluoropropylene, polytetrafluoroethylene, polyhexafluoropropylene, polyethyleneoxide, polypropyleneoxide, polyphosphazene, polysiloxane, polyvinyl acetate, polyvinyl alcohol, methyl polymethacrylate, polyacrylic acid, polymethacrylic acid, styrene-butadiene rubber, nitrile-butadiene rubber, polystyrene, and polycarbonate. From the viewpoint of the electrochemical stability, polyacrylonitrile, polyvinylidene fluoride, polyhexafluoropropylene and polyethyleneoxide are particularly preferable.

(4-2) Method for Producing Nonaqueous Electrolyte Secondary Battery

Next, a method for producing a nonaqueous electrolyte secondary battery using the cathode active material according to one embodiment will be described. First, each of a cathode 342 and an anode 343 is coated with a precursor solution containing a solvent, an electrolyte salt, a polymer compound and a mixed solvent, and then, the mixed solvent is volatilized to form a gel electrolyte layer 345. A cathode lead 332 is previously attached to the end of a cathode current collector by welding, and at the same time, an anode lead 333 is also attached to the end of an anode current collector 343A by welding.

Subsequently, the cathode 342 and the anode 343, both on which the gel electrolyte layers 345 are formed, are laminated via a separator 344, and the resulting laminate is wound in a longitudinal direction to form a wound battery element 330.

Next, a covering material 337 composed of a laminate film is subjected to drawing to form a concave part 336, and the battery element 330 is inserted into the concave part 336. Then, an unprocessed part of the covering material 337 is bent to the top part of the concave part 336, and the periphery of the concave part 336 is welded to seal, whereby a nonaqueous electrolyte secondary battery is produced.

EXAMPLES

Example 6

First, 10 parts by weight of composite oxide particles having an average composition of $Li_{1.03}CoO_{2.02}$, an average particle size, measured by a laser scattering method, of 13 μm, and a specific surface area of 0.3 m²/g were dispersed by stirring in 300 parts by weight of a 2N aqueous LiOH solution at 80° C. for 1 hour.

Then, a solution obtained by dissolving 1.54 parts by weight of a commercial reagent, nickel nitrate $Ni(NO_3)_2 \cdot 6H_2O$ and 0.83 part by weight of a commercial reagent, manganese nitrate $Mn(NO_3)_2 \cdot 6H_2O$ in 10 parts by weight of pure water was added thereto over 2 hours.

Then, a solution obtained by dissolving 0.20 part by weight of a commercial reagent, yttrium nitrate $Y(NO_3)_3 6H_2O$ in 5 parts by weight of pure water was added thereto over 1 hour, and the mixture was stirred at 80° C. over further 1 hour to disperse, which was allowed to cool.

Subsequently, the dispersion system was filtered, and dried at 120° C. In order to adjust a lithium amount, 10 parts by weight of the precursor sample was impregnated with 2 parts by weight of a 2N aqueous LiOH solution, and the mixture was uniformly mixed and dried to give a precursor for calcination. The temperature of the precursor for calcination was elevated at a rate of 5° C./minute to 950° C. in an electric furnace, and it was kept at the same temperature for 5 hours, and then was cooled down at a temperature rate of 7° C./minute to 150° C. to give a cathode active material of Example 6.

Example 7

A cathode active material was produced in the same manner as in Example 6 except that an amount of the nickel nitrate $Ni(NO_3)_2 \cdot 6H_2O$ added was changed to 3.08 parts by weight; an amount of the manganese nitrate $Mn(NO_3)_2 \cdot 6H_2O$ added was changed to 3.30 parts by weight; an amount of the yttrium nitrate $Y(NO_3)_3 6H_2O$ added was changed to 0.80 part by weight; an amount of the pure water used for dissolving the nickel nitrate and the manganese nitrate was changed to 5 parts by weight; and an amount of the 2N aqueous lithium hydroxide solution used for impregnating in order to adjust the lithium amount was changed to 5 parts by weight.

Example 8

A cathode active material of Example 8 was produced in the same manner as in Example 6 except that an amount of the nickel nitrate $Ni(NO_3)_2 \cdot 6H_2O$ added was changed to 3.08 parts by weight; an amount of the manganese nitrate $Mn(NO_3)_2 \cdot 6H_2O$ added was changed to 1.65 parts by weight; an amount of the yttrium nitrate $Y(NO_3)_3 6H_2O$ added was change to 0.80 part by weight; an amount of the pure water used for dissolving the nickel nitrate and the manganese nitrate was change to 20 parts by weight; and an amount of the 2 N aqueous lithium hydroxide solution used for impregnating in order to adjust the lithium amount was changed to 4 parts by weight.

Comparative Example 3

The same composite oxide particles as used in Example 6, which had an average composition of $Li_{1.03}CoO_{2.02}$, an average particle size, measured by a laser scattering method, of 13 μm, and a specific surface area of 0.3 m²/g, were used as a cathode active material of Comparative Example 3.

Comparative Example 4

A cathode active material of Comparative Example 4 was produced in the same manner as in Example 6 except that the yttrium nitrate $Y(NO_3)_3 \cdot 9H_2O$ was not added.

Evaluation:

Using the cathode active materials produced in Examples 6 to 8 and Comparative Examples 3 and 4, secondary batteries shown in FIGS. 5 and 6 were produced. First, 86 wt % of the produced cathode active material powder, 10 wt % of glaphite as a conductive agent, and 4 wt % of polyvinylidene fluoride as a binder were mixed, and the mixture was dispersed in a solvent, N-methyl-2-pyrrolidone. Then, the dispersion was coated on both sides of a cathode current collector 302A composed of a strip aluminum foil having a thickness of 20 μm, and the obtained collector was dried. Subsequently, compression-molding was performed by using a roller press to form a cathode mixture layer 302B, from which a cathode 302 was produced. At that time, the cathode active material powder was thoroughly pulverized with a kneader so as to pass through a sieve having an opening of 70 μm. A void ratio of the cathode mixture layer 302B was controlled to a volume ratio of 26%. Next, an aluminum cathode lead 313 was attached to the cathode current collector 302A.

Further, 90 wt % of an artificial graphite powder as an anode active material and 10 wt % of polyvinylidene fluoride as a binder were mixed, and the mixture was dispersed in a solvent, N-methyl-2-pyrrolidone. Then, the dispersion was coated on both sides of an anode current collector 303A composed of a strip copper foil having a thickness of 10 μm, and the obtained collector was dried. Subsequently, compression-molding was performed by using a roller press to form an anode mixture layer 303B, from which an anode 303 was produced. Next, a nickel anode lead 314 was attached to the anode current collector 303A.

The thus obtained strip cathode 302 and strip anode 303 were wound in large number of turns via a porous polyolefin film as a separator 304, to produce a spirally wound electrode assembly 320. The wound electrode assembly 320 was housed in an iron battery can 301, and a pair of insulating plates 305 and 306 were placed on the top side and bottom side of the wound electrode assembly 320. Then, the cathode lead 313 was drawn out of the cathode current collector 302A, and was welded to a safety valve mechanism 308. Similarly, the anode lead 314 was drawn out of the anode current collector 303A and was welded to the bottom part of the battery can 301. Thereafter, an electrolyte solution was injected to the inside of the battery can 301, and the battery can 301 was crimped via a gasket 310 to fix the safety valve mechanism 308, a positive temperature coefficient element 309 and a battery lid 307, thereby obtaining a cylindrical secondary battery having an outer diameter of 18 mm and a height of 65 mm. As the electrolyte solution, a solution obtained by dissolving 1.0 mol/l of an electrolyte salt, $LiPF_6$ in a solvent of ethylene carbonate and diethyl carbonate (1:1 by volume) was used.

The thus produced secondary batteries were subjected to charge and discharge at a temperature of 45°, thereby determining an initial capacity, which was a discharge capacity at the first cycle, and a discharge capacity maintenance rate, which was a ratio of a discharge capacity at the 200-th cycle to that of the first cycle.

The charge was conducted by performing constant current charge until a battery voltage reached 4.40 V with a constant current of 1000 mA, and then performing constant voltage charge until the total charging time with a constant volume of 4.40 V reached 2.5 hours. The discharge was conducted by performing constant current discharge until a battery voltage reached 2.75 V with a constant current of 800 mA. The measurement results are shown in Table 2.

TABLE 2

|  | INITIAL CAPACITY (mAh) | DISCHARGE CAPACITY MAINTENANCE RATE (%) |
| --- | --- | --- |
| Example 6 | 2420 | 82 |
| Example 7 | 2460 | 83 |
| Example 8 | 2450 | 85 |
| COMPARATIVE EXAMPLE 3 | 2510 | 30 |
| COMPARATIVE EXAMPLE 4 | 2450 | 79 |

As shown in Table 2, it is understood that the batteries using the cathode active materials obtained in Examples 6 to 8 had high capacities, and higher discharge capacity maintenance rates than those of the batteries using the cathode active materials obtained in Comparative Examples 3 and 4.

The present application is not limited to the embodiments mentioned above, and various modifications and applications can be made without departing from the scope of the application. For example, the shapes thereof are not particularly limited, and cylindrical types, square types, coin types, button types, and the like may be used.

In the third embodiment, the nonaqueous electrolyte secondary battery has the electrolyte solution as the electrolyte, and in the fourth embodiment, the nonaqueous electrolyte secondary battery has the gel electrolyte as the electrolyte. However, the present application is not limited thereto.

For example, not only the electrolytes mentioned above, but also polymer solid electrolytes utilizing an ionically conductive polymer, inorganic solid electrolytes utilizing an ionically conductive inorganic material, and the like may be used as the electrolyte. Further, they may be used alone or as a mixture with another electrolyte. Examples of the polymer compound used in the polymer solid electrolyte may include polyether, polyester, polyphosphazene, and polysiloxane. Examples of the inorganic solid electrolyte may include ionically conductive ceramics, ionically conductive crystal, and ionically conductive glass.

Further, for example, the electrolyte solution in the non-aqueous electrolyte secondary battery is not particularly limited, and conventional nonaqueous solvent system electrolyte solutions may be used. Of these, preferable examples of the nonaqueous electrolyte solution including an alkali metal salt in the secondary battery include propylene carbonate, ethylene carbonate, y-butyrolactone, N-methylpyrrolidone, acetonitrile, N,N-dimethylformamide, dimethylsulfoxide, tetrahydrofuran, 1,3-dioxolane, methyl formate, sulfolane, oxazolidone, thionyl chloride, 1,2-dimethoxyethane, diethylenecarbonate, derivatives thereof, and mixtures thereof. Preferable examples of the electrolyte contained in the electrolyte solution include alkali metals, particularly calcium halide, perchlorate, thiocyanogen salts, fluoroborates, fluorophosphates, arsenic fluoride, yttrium fluoride, and trifluoromethylsulfuric acid salts.

Now, seventh, eighth and ninth embodiments will be explained with respect to drawings. A cathode active material according to one embodiment has a coating layer which contains an oxide including lithium Li and an oxide(s) including a coating element(s) of nickel Ni, or nickel Ni and manganese Mn on at least a part of a composite oxide particle, and has a surface layer which includes vanadium V on at least a part of the coating layer.

First, the reason that the cathode active material has the above-mentioned structure will be explained. Cathode active materials mainly containing lithium cobaltate $LiCoO_2$ have high charge voltage property and corresponding high energy density property, but their capacities remarkably lower by repeating charge and discharge cycle under a high capacity at a high charge voltage. The lowering is due to surface state of the cathode active material, and the necessity of a surface treatment of the cathode active material is pointed out.

Consequently, various surface treatments are proposed. From the viewpoints that a capacity per volume or weight is not lowered or lowering of a capacity is minimized, cathode active materials having high charge voltage property and corresponding high energy density property, as well as good charge-discharge cycling characteristics at a high charge voltage can be obtained by inhibiting the lowering of the capacity, or coating a material which contributes to inhibition of the lowering the capacity on the surface.

As a result of the present inventors' intensive study, it has been found that it is possible to obtain cathode active materials having high charge voltage property and corresponding high energy density property, though they are lower a little, as well as good charge-discharge cycling characteristics of the high capacity under a high charge voltage condition. The cathode active materials are obtained by forming a coating layer which contains an oxide including lithium Li and an oxide(s) including at least one coating element of nickel Ni and manganese Mn on a cathode active material mainly containing lithium cobaltate $LiCoO_2$.

As a method for forming a coating layer on composite oxide particles, the following two methods are proposed. In one method, a lithium Li compound, and a nickel Ni compound and/or manganese Mn compound are pulverized with the composite oxide particles to give fine particles, and they are dry-mixed, applied to each other, and calcined to form a coating layer which contains an oxide including the lithium Li and an oxide(s) including the coating element(s) of at least one of the nickel Ni and the manganese Mn on the surface of the composite oxide particles. In the other method, a lithium Li compound, and a nickel Ni compound and/or a manganese Mn compound are dissolved in or mixed with a solvent, and subjected to wet-application and calcination to form a coating layer which contains an oxide including the lithium Li and an oxide(s) including at least one coating element of the nickel Ni and the manganese Mn on the surface of the composite oxide particles. However, these methods give the results that it may be impossible to obtain a high uniform coating.

It has been found that a coating layer is formed by applying a hydroxide(s) of nickel Ni and/or manganese Mn and dehydrating the resulting product with heating to give a coating layer having high uniformity. According to this application treatment, a nickel Ni compound and/or a manganese Mn compound are/is dissolved in a solvent system mainly containing water, then composite oxide particles are dispersed in the solvent system, a base is added to the dispersion system, or the like to increase the basicity of the dispersion system, whereby hydroxide(s) including the nickel Ni and/or the manganese Mn are precipitated on the surface of the composite oxide particles.

The composite oxide particles to which the hydroxide of nickel Ni and/or manganese Mn are/is applied by the application treatment are dehydrated with heating to form a coating layer on the composite oxide particles. This makes it possible to improve uniformity of the coating on the composite oxide particles.

The present inventors have further advanced their intensive study, and have found that in a step in which a hydroxide(s) including nickel Ni and/or manganese Mn are/is applied to the surface of the composite oxide particles, and the resulting particles are washed, dehydrated and dried for calcination, the particles are bound to each other through the hydroxide(s)

including the nickel Ni and/or the manganese Mn applied on the surface; and that when the bound particles are cracked, the interfacial peeling occurs between the hydroxide(s) including the nickel Ni and/or the manganese Mn and the composite oxide particles because of the relatively lower adhesive property, or cohesion failure is caused in the hydroxides including the nickel Ni and/or the manganese Mn because of the low cohesion force, thereby impairing the improvement of the characteristic properties of the cathode active material by forming the coating layer.

In addition, it has also been found that if the calcination process to which lithium Li is added is continued in the presence of the bound particles, or in the state that particles including the hydroxide(s) which include(s) the nickel Ni and/or the manganese Mn on their surfaces are brought into contact with each other, the sintering between the particles tends to easily advance.

When the sintering between the particles advances too much, the following problems are raised. When a cathode is formed, it is required to increase an input of mechanical energy for use in cracking of the particles, which is conducted for uniformly mixing the particles with a binder and a conductive agent, carbon particles. Consequently, the cathode active material including the composite oxide particles having the coating layer is damaged or broken, resulting in an increased number of the defective particles in totality.

The failure or breakdown appears as breaking of a connecting part between the sintered particles, formation of fissure in the particles, fracture of the particles, peeling-off of the coating layer, and the like. In particular, the composite oxide particles having the coating layer tend to have an uneven surface rather than a smooth surface, as compared with the cathode active material mainly containing lithium cobaltate $LiCoO_2$. From this constitution, when an external force is applied to them, probably, the particles hardly slide on each other, and the external force is easily concentrated on a spot, whereby the failure or the breakdown easily occurs.

As a result, a surface where the coating layer is not formed is exposed. In other words, the surface having no coating layer, which does not function for improving the charge-discharge cycling characteristics, and an active newborn surface are exposed. This deteriorates the charge-discharge cycling characteristics under a high charge voltage condition at a high capacity. As is known well, the exposed surface is active and has a high surface energy. Such a surface has, accordingly, very high activity in decomposition reaction of the electrolyte solution and elution activity, as compared with surfaces formed in a usual calcination.

In order to improve the cathode functions and the production process, the present inventors have advanced intensive study based on the sintering between the particles, and have found that when a composite oxide particle whose surface has been applied with a hydroxide(s) including nickel Ni, or nickel Ni and manganese Mn, is further applied with vanadic acid, the progress of sintering can be improved. It has also found that the failure or breakdown of the particles can be reduced, accordingly. Next, a composite oxide, a coating layer, and a surface layer will be described.

[Composite Oxide]

The composite oxide particle has, for example, an average composition represented by the formula 1. The composite oxide particle has the average composition represented by the formula 1, and thus can have a high capacity and a high discharge voltage.

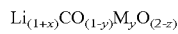 (formula 1)

wherein M is at least one element selected the group consisting of magnesium Mg, aluminum Al, boron B, titanium Ti, vanadium V, chromium Cr, manganese Mn, iron Fe, nickel Ni, copper Cu, zinc Zn, molybdenum Mo, tin Sn, and tungsten W; and x, y and z satisfy the relationships of $-0.10 \leq x \leq 0.10$, $0 \leq y < 0.50$, and $-0.10 \leq z \leq 0.20$.

In the formula 1, x is in the range of $-0.10 \leq x \leq 0.10$, preferably $-0.08 \leq x \leq 0.08$, and more preferably $-0.06 \leq x \leq 0.06$. When the value of x is less than the above-mentioned range, the discharge capacity may lower. When the value of x is more than the above-mentioned range, lithium may diffuse out of the particles, and the basicity control in a subsequent treatment step may be impaired, finally resulting in a harmful influence on promotion of gelation while kneading the cathode paste.

y is in the range of $0 \leq y < 0.50$, preferably $0 \leq y < 0.40$, and more preferably $0 \leq y < 0.30$. When the value of y is more than the above-mentioned range, the high charge voltage property possessed by $LiCoO_2$, and corresponding high energy density property may be impaired.

z is in the range of $-0.10 \leq z \leq 0.20$, preferably $-0.08 \leq z \leq 0.18$, and more preferably $-0.06 \leq z \leq 0.16$. When the value of z is less than or more than the above-mentioned range, it tends to lower the discharge capacity.

Although materials which are available as a cathode active material can be usually used as a starting material of the composite oxide particles, in some cases, particles obtained by cracking secondary particles with a ball mill, a kneader or the like may be used.

[Coating Layer]

The coating layer is formed on at least a part of the composite oxide particle, and contains an oxide including lithium Li and an oxide(s) including a coating element(s) of nickel Ni, or nickel Ni and manganese Mn. Formation of such a coating layer gives high charge voltage property and corresponding high energy density property, and can improve charge-discharge cycling characteristics under a high charge voltage condition at a high capacity.

A composition ratio of nickel Ni and manganese Mn in the coating layer is preferably within the range of 100:0 to 30:70, and more preferably 100:0 to 40:60. The larger the amount of the manganese Mn, the lower the occlusive property of lithium Li, finally resulting in lowering of the capacity of the cathode active material and increasing an electric resistance when using it in a battery. The above-mentioned range of the composition ratio of the nickel Ni and the manganese Mn is a range showing better effectiveness, in other words, in this range, the progress of the sintering between the particles is inhibited, in the process of calcinating a precursor to which lithium Li is added.

It is possible to substitute the nickel Ni and the manganese Mn in the oxides in the coating layer with at least one metal element selected from the group consisting of magnesium Mg, aluminum Al, boron B, titanium Ti, vanadium V, chromium Cr, iron Fe, cobalt Co, copper Cu, zinc Zn, molybdenum Mo, tin Sn, and tungsten W.

The substitution makes it possible to improve the stability of the cathode active material and the diffusibility of the lithium ion. An amount of the selected metal element substituted is not more than 40 mol %, of the total amount of the nickel Ni and the manganese Mn in the oxides in the coating layer, preferably not more than 30 mol %, and more preferably not more than 20 mol %. If the amount of the selected metal element substituted is more than the above-mentioned range, the occlusive property of the lithium Li and the capacity of the cathode active material may lower.

The amount of the coating layer is 0.5 wt % to 50 wt % of the composite oxide particles, preferably 1.0 wt % to 40 wt %, and more preferably 2.0 wt % to 35 wt %. This is because when the amount of the coating layer is more than the above-mentioned range, the capacity of the cathode active material lowers; while when the amount of the coating layer is less than the above-mentioned range, the stability of the cathode active material lowers.

[Surface Layer]

The surface layer is formed on at least a part of the coating layer, and includes vanadium V. Formation of the surface layer is formed can inhibit the binding between the particles. Also, the surface layer including vanadium V probably contributes to the effects of the above-mentioned coating layer. Elution activity of the surface is further inhibited by the surface layer, as compared with the case where only the coating layer is formed.

An average particle size of the cathode active material is from 2.0 μm to 50 μm. When the average particle size is less than 2.0 μm, peeling-off occurs by press during the production of the cathode, and it is required to increase amounts of a conductive agent and a binder to be added because the surface area of the active material is increased, and therefore, it tends to lower energy density per unit weight. On the other hand, when the average particle size is more than 50 μm, the particles tend to pass through a separator, thus resulting in a short circuit.

[Method for Producing Cathode Active Material]

Next, a method for producing a cathode active material according to one embodiment will be described. The method for producing a cathode active material according to one embodiment is divided into two steps. In a first step, a layer which contains a hydroxide(s) including nickel Ni, or nickel Ni and manganese Mn on at least a part of a composite oxide particle, and then vanadic acid is applied to at least a part of the composite oxide particle. In a second step, the composite oxide particle is heated after applying the vanadic acid to form, on at least a part of the composite oxide particle, a coating layer which contains an oxide including lithium Li and an oxide(s) including a coating element(s) of nickel Ni, or nickel Ni and manganese Mn, and a surface layer which includes vanadium V.

(First Step)

In the first step, application treatment of a hydroxide(s) including nickel Ni, or nickel Ni and manganese Mn, and application treatment of vanadic acid are performed. According to the first step, for example, first, composite oxide particles are dispersed in a solvent system mainly containing water in which a nickel Ni compound, or a nickel Ni compound and a manganese Mn compound is/are dissolved, and a base is added to the dispersion system, or the like to increase the basicity of the dispersion system, whereby a hydroxide(s) including the nickel Ni, or the nickel Ni and the manganese Mn is/are precipitated on the surface of the composite oxide particles. Also, composite oxide particles may be dispersed in a basic solvent mainly containing water, and then a nickel Ni compound, or a nickel Ni compound and a manganese Mn compound may be added to the aqueous solution, whereby a hydroxide(s) including the nickel Ni, or the nickel Ni and the manganese Mn may be precipitated.

Examples of the starting material of the nickel Ni compound may include inorganic compounds such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogen sulfide, nickel nitride, nickel nitrite, nickel phosphate, and nickel thiocyanate; and organic compounds such as nickel oxalate and nickel acetate. They may be used as they are, or may be treated with an acid or the like to be converted into compounds capable of dissolving in a solvent system, as occasion demands.

Examples of the starting material of the manganese Mn compound may include inorganic compounds such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrosulfide, manganese nitrate, manganese hydrogen sulfate, manganese thiocyanate, manganese nitrite, manganese phosphate, manganese dihydrogen phosphate, and manganese hydrogen carbonate; and organic compounds such as manganese oxalate and manganese acetate. They may be used as they are, or may be treated with an acid or the like to be converted into compounds capable of dissolving in the solvent system, as occasion demands.

A pH of the above-mentioned solvent system mainly containing water is not less than pH 12, preferably not less than pH 13, and more preferably not less than pH 14. The higher the pH of the solvent system mainly containing water, the better the uniformity of the application of the hydroxide(s) including the nickel Ni, or the nickel Ni and the manganese Mn, as well as the higher the reaction accuracy. Thus, the productivity is improved due to the shortened treatment time, and the quality is improved. The pH of the solvent system mainly containing water is decided depending on the cost of an alkali to be used, and the like.

The temperature of the dispersion system during treatment is not less than 40° C., preferably not less than 60° C., and more preferably not less than 80° C. The higher the temperature of the dispersion system during treatment, the better the uniformity of the application of the hydroxide(s) including the nickel Ni, or the nickel Ni and the manganese Mn, as well as the higher the reaction speed. Thus, the productivity is improved due to the shortened treatment time, and the quality is improved. A treatment conducted at 100° C., using an autoclave can be preferred from the viewpoint of the improvement of the uniformity of the application and the productivity due to the shortened treatment time caused by improvement in the faster reaction speed, although it is decided depending on the balance between the cost of the apparatus and the productivity.

The pH of a solvent system mainly containing water can be adjusted by dissolving an alkali in the solvent system mainly containing water. Examples of the alkali may include lithium hydroxide, sodium hydroxide, potassium hydroxide, and mixtures thereof. Although the adjustment of the pH may be performed by appropriately using the above-mentioned alkali, it is preferable to use lithium hydroxide, from the viewpoint of the purity and the performance of the resulting cathode active material according to one embodiment. The advantage of using lithium hydroxide is that when the composite oxide particles on which the hydroxide(s) including the nickel Ni, or the nickel Ni and the manganese Mn is/are formed are taken out of the solvent system mainly containing water, the amount of the lithium in the resulting cathode active material according to one embodiment can be controlled by controlling the application mass of the solvent mainly containing water.

Subsequently, vanadic acid is applied to at least a part of the composite oxide particles having formed thereon the layer which contains the hydroxide(s) including the nickel Ni, or the nickel Ni and the manganese Mn. The application treatment of the vanadic acid is effectively performed in a state in which the vanadic acid is suspended in the solvent system mainly containing water which is used in the application treatment of the hydroxide including the nickel Ni, or the nickel Ni and the manganese Mn. By using this system, in a step of dehydrating and drying the composite oxide particles on which the layer which includes the hydroxide(s) including the nickel Ni, or the nickel Ni and the manganese Mn is/are formed, it is possible to inhibit the binding of the particles through the hydroxide(s) including the nickel Ni, or the nickel Ni and the manganese Mn on the surface.

In addition, it is effective that the application treatment of the vanadic acid is performed in a washing step after the application treatment of the hydroxide including the nickel Ni, or the nickel Ni and the manganese Mn. By employing this process, leakage of the vanadic acid added to the suspension system can be prevented, as well as absorption property can be improved. Further, by utilizing the application treatment of the vanadic acid, an effect for promoting particle aggregation can be obtained without causing binding between the particles in the dispersion system, thereby making it possible to easily perform washing and recovery of the particles from the dispersion system.

As the vanadic acid may be, any vanadic acid may be used such as ortho vanadic acid, pyro vanadic acid, and meta vanadic acid. Examples of the starting material of the vanadic acid which can be used in the application treatment may include lithium meth-vanadate, magnesium meta-vanadate, ammonium meta-vanadate, cesium meta-vanadate, cesium ortho-vanadate, potassium meta-vanadate, potassium ortho-vanadate, sodium meta-vanadate, sodium ortho-vanadate, vanadic acid, and vanadic acid anhydride.

An amount of the vanadic acid applied is from 0.00001 wt % to 1.0 wt % based on the weight of the composite oxide particles. The amount is preferably from 0.0001 wt % to 0.1 wt %. When the amount of the vanadic acid applied is more than the above-mentioned range, the capacity of the cathode active material lowers. When the amount of the vanadic acid applied is less than the above-mentioned range, the stability of the cathode active material lowers.

(Second Step)

In the second step, the composite oxide particles subjected to the application treatment in the first step are separated from the solvent system mainly containing water, and then, the obtained particles are heated to dehydrate the hydroxide(s) to form a coating layer which contains an oxide including lithium Li and an oxide(s) including the coating element(s) of the nickel Ni, or the nickel Ni and the manganese Mn on the surface of the composite oxide particles, and a surface layer including vanadium V. It is preferable that the heat treatment is performed in an oxidative atmosphere including air or pure oxygen at a temperature of about 300° C. to 1000° C. In this case, since the vanadic acid adheres to the hydroxide(s) including the nickel Ni, or the nickel Ni and the manganese Mn, the sintering between the particles is inhibited, and the binding between the particles is inhibited.

After the composite oxide particles, which have been subjected to the application treatment in the first step, are separated from the solvent system, and if necessary, the particles may be impregnated with an aqueous solution of a lithium compound in order to adjust the amount of the lithium, followed by heating the resulting particles.

Examples of the lithium compound may include inorganic compounds such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrosulfide, lithium sulfate, lithium hydrogensulfate, lithium nitride, lithium azide, lithium nitrite, lithium phosphate, lithium dihydrogen phosphate, and lithium hydrogencarbonate; and organic compounds such as methyl lithium, vinyl lithium, isopropyl lithium, butyl lithium, phenyl lithium, lithium oxalate, and lithium acetate.

After the calcination, the particle size may be adjusted by using light pulverization, classification, or the like, as occasion demands.

Next, a nonaqueous electrolyte secondary battery using the cathode active material according to one embodiment mentioned above will be described.

Figure 9:
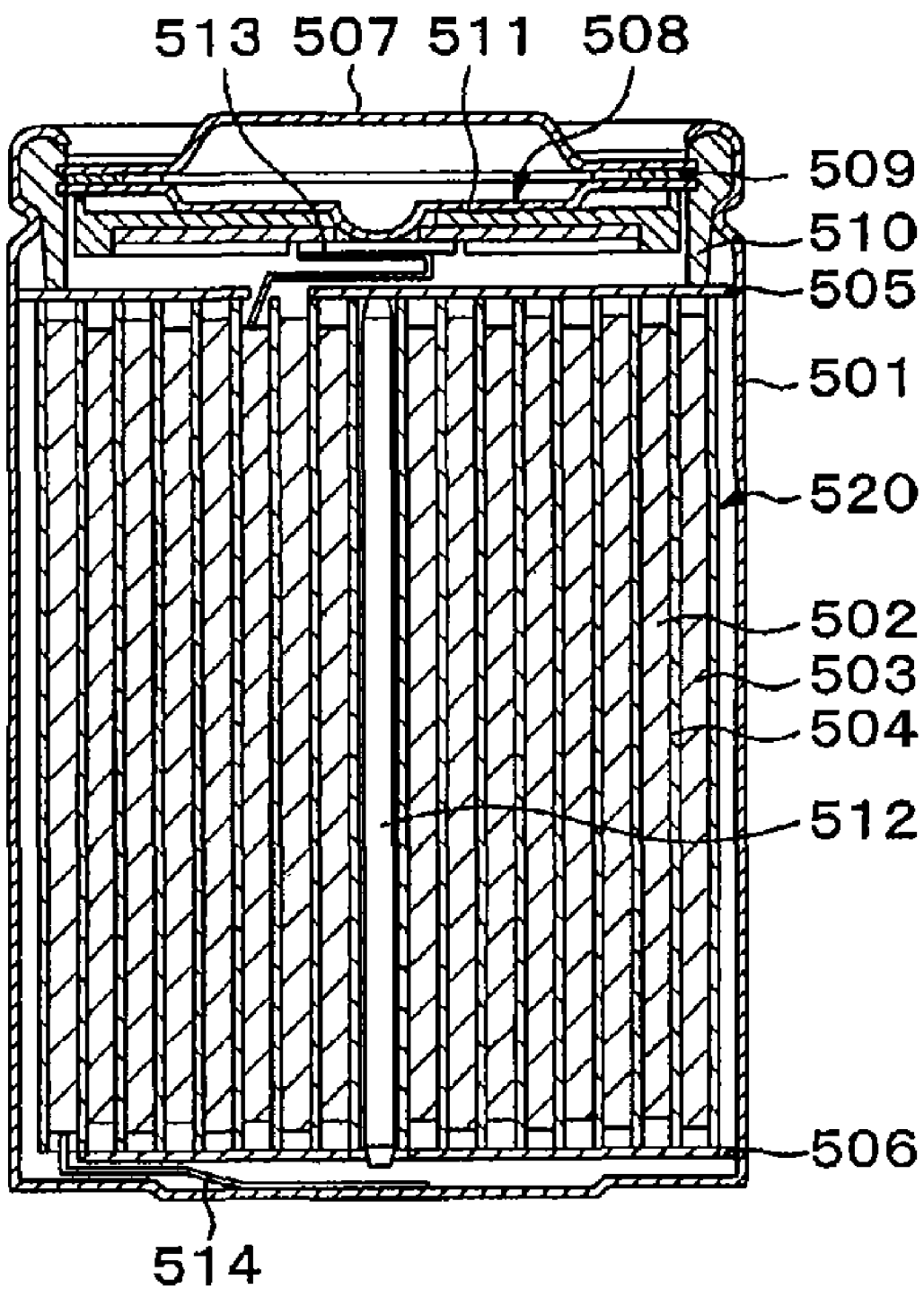
FIG. 9 is a schematic cross-sectional view showing a fifth embodiment which is a nonaqueous electrolyte secondary battery using a cathode active material according to an embodiment.

(5) Fifth Embodiment of Nonaqueous Electrolyte Secondary Battery (5-1) Configuration of Nonaqueous Electrolyte Secondary Battery FIG. 9 shows a cross-sectional structure of a nonaqueous electrolyte secondary battery using the cathode active material according to the fifth embodiment.

The secondary battery has an open-circuit voltage of, for example, not less than 4.25 V and not more than 4.65 V per a pair of cathode and anode under a full charge state.

The secondary battery is a so-called cylindrical battery, and has a wound electrode assembly 520 in a battery can 501 which is a substantially hollow cylinder. In the wound electrode assembly 520, a strip cathode 502 and a strip anode 503 are wound via a separator 504.

The battery can 501 is composed of, for example, iron Fe plated with nickel Ni, whose one end is closed and the other end is open. Inside of the battery can 501, a pair of insulating plates 505 and 506 are placed perpendicularly to a winding circumference so as to sandwich the wound electrode assembly 520 therebetween.

To the open end of the battery can 501 are attached a battery lid 507, and a safety valve mechanism 508 and a positive temperature coefficient element (PTC element) 509, which are formed at the inside of the battery lid 507, by crimping via a gasket 510. The inside of the battery can 501 is sealed. The battery lid 507 is made of, for example, the same material as the battery can 501. The safety valve mechanism 508 is electrically connected to the battery lid 507 through the positive temperature coefficient element 509. When the internal pressure of the battery becomes not less than a certain value by an internal short-circuit or heat from the outside, then a disc plate 511 is reversed to cut the electric connection between the battery lid 507 and the wound electrode assembly 520. When a temperature is raised, the positive temperature coefficient element 509 controls an electric current by increased electrical resistivity, thereby preventing an unusual amount of heat caused by the high electric current. The gasket 510 is composed of, for example, an insulating material, whose surface is coated with asphalt.

The wound electrode assembly 520 has, for example, a center pin 512 around which the electrodes are wound. To the cathode 502 in the wound electrode assembly 520 is connected a cathode lead 513 made of, for example, aluminum Al or the like, and to the anode 503 is connected an anode lead 554 made of, for example, nickel Ni or the like. The cathode lead 513 is electrically connected to the battery lid 507 by being welded to the safety valve mechanism 508, and the anode lead 514 is electrically connected to the battery can 501 by welding.

[Cathode]

Figure 10:
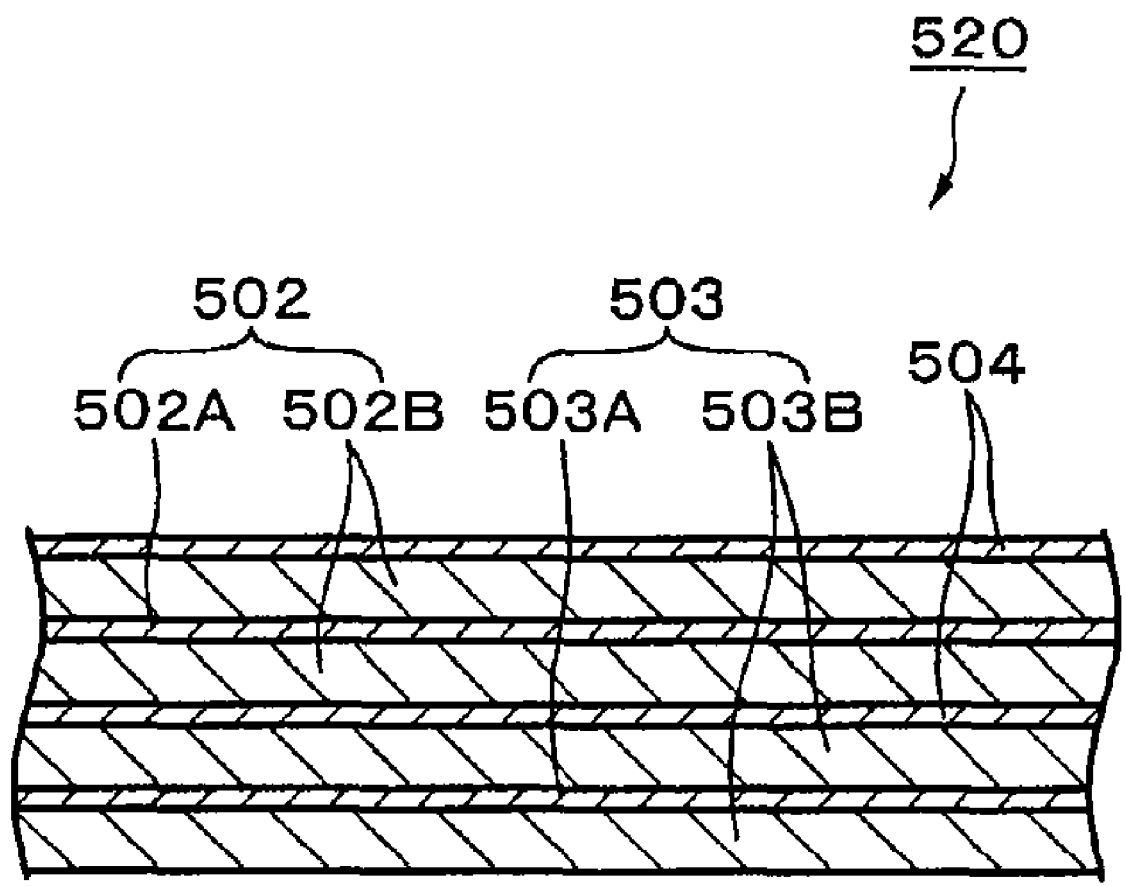
FIG. 10 is an enlarged cross-sectional view showing a part of a wound electrode assembly shown in FIG. 9.

FIG. 10 is an enlarged view showing a part of the wound electrode assembly 520 shown in FIG. 9. As shown in FIG. 10, the cathode 502 has, for example, a cathode current collector 502A having a pair of faces facing to each other, and cathode mixture layers 502B formed on both sides of the cathode current collector 502A. The cathode mixture layer 502B may be formed in an area of only one side of the cathode current collector 502A. The cathode current collector 502A is composed of, for example, a metal foil such as aluminum Al foil. The cathode mixture layer 502B contains, for example, a cathode active material, and may contain, if necessary, a conductive agent such as glaphite and a binder such as polyvinylidene fluoride. As the cathode active material, the cathode active material according to one embodiment mentioned above may be used.

[Anode]

As shown in FIG. 10, the anode 503 has, for example, an anode current collector 503A having a pair of faces facing to each other, and anode mixture layers 503B formed on both sides of the anode current collector 503A. The anode mixture layer 503B may be formed in an area of only one side of the anode current collector 503A. The anode current collector 503A is composed of, for example, a metal foil such as copper Cu foil. The anode mixture layer 503B contains, for example, an anode active material, and may contain, if necessary, a binder such as polyvinylidene fluoride.

The anode active material includes an anode material which can absorb and release lithium Li (hereinafter, sometimes, referred to as a "anode material capable of absorbing/releasing lithium Li"). Example of the anode material capable of absorbing/releasing lithium Li may include carbon materials, metal compounds, oxides, sulfides, lithium nitrides such as $LiN_3$, lithium metals, metals forming an alloy together with lithium, and polymer materials.

Examples of the carbon material may include low-graphitized carbons, easily-graphitized carbons, graphite, pyrocarbons, cokes, glassy carbons, organic polymer compound sintered bodies, carbon fibers, and activated carbon. Of these, the cokes may include pitch coke, needle coke, and petroleum coke. The organic polymer compound sintered bodies refer to materials obtained by calcinating a polymer material such as a phenol plastic or a furan resin at an appropriate temperature to carbonize it, some of which are classified into low-graphitized carbons or easily-graphitized carbons. Examples of the polymer material may include polyacetylene and polypyrrole.

Among such anode materials capable of absorbing/releasing lithium Li, materials having a charge and discharge voltage near to that of lithium metal are preferable. This is because the lower the charge and discharge voltage of the anode 503, the battery more easily has a higher energy density. Of these, the carbon materials are preferable because they have only a small change of their crystal structures on charge and discharge, and thus, good cycling characteristics as well as a high charge and discharge capacity can be obtained. The graphite is particularly preferable because it can give large electrochemical equivalent and a high energy density. The low-graphitized carbon is also preferable because it can give good cycling characteristics.

Further, the anode material capable of absorbing/releasing lithium Li may include lithium elemental metal, metal elements and semi-metal elements capable of forming an alloy together with lithium Li, and alloys and compounds including such an element. They are preferable because they can give a high energy density. In particular, it is more preferable to use them together with the carbon material because, in such a case, good cycling characteristics as well as a high energy density can be obtained. The alloy used herein includes, in addition to alloys including two or more metal elements, alloys including one or more metal elements and one or more semi-metal elements. The alloy may be in the state of a solid solution, eutectic crystal (eutectic mixture), intermetallic compound, and mixture thereof.

Examples of the metal element and the semi-metal element may include tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, hafnium Hf, and the like. Examples of the above-mentioned alloy and compound may include materials having the chemical formula: $Ma_sMb_tLi_u$ and materials having the chemical formula: $Ma_pMc_qMd_r$. In the chemical formulas, Ma denotes at least one element of metal elements and semi-metal elements capable of forming an alloy together with lithium; Mb denotes at least one element of metal elements and semi-metal elements other than lithium and Ma; Mc denotes at least one element of non-metal elements; Md denotes at least one element of metal elements and semi-metal elements other than Ma; and s, t, u, p, q and r satisfy $s>0$, $t \geq 0$, $u \geq 0$, $p>0$, $q>0$, and $r \geq 0$.

Of these, metal elements and semi-metal elements of Group IVB Short Periodic Table, and alloys and compounds including such an element are preferable, and silicon Si, tin Sn, and alloys and compounds including Si and/or Sn are particularly preferable. They may be crystals or amorphous.

In addition, inorganic compounds including no lithium Li such as $MnO_2$, $V_2O_5$, $V_6O_{13}$, NiS, and MoS may be used in either cathode or anode.

[Electrolyte Solution]

As the electrolyte solution, a nonaqueous electrolyte solution obtained by dissolving an electrolyte salt in a nonaqueous solvent may be used. Preferable nonaqueous solvent may be, for example, solvents including at least one of ethylene carbonate and propylene carbonate because they can improve cycling characteristics. It is particularly preferable to contain a mixture of ethylene carbonate and propylene carbonate in the electrolyte because the cycling characteristics can further be improved. Nonaqueous solvents containing at least one ester selected from chain carbonic acid esters such as diethyl carbonate, dimethyl carbonate, ethyl methyl carbonate, and methyl propyl carbonate are also preferable, because they can further improve cycling characteristics.

Nonaqueous solvents containing at least one of 2,4-difluoroanisole and vinylene carbonate are also preferable, because the 2,4-difluoro anisole can improve discharge capacity and the vinylene carbonate can improve cycling characteristics. Nonaqueous solvents containing a mixture thereof are more preferable because both of the discharge capacity and the cycling characteristics can be improved.

The nonaqueous solvent may further contain at least one compound of butylene carbonate, γ-butyrolactone, γ-valerolactone, compounds thereof whose hydroxyl group(s) is/are all or partially substituted with a fluorine-containing group(s), 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropyl nitrile, N,N-dimethylformamide, N-methylpyrrolidinone, N-methyloxazolidinone, N,N-dimethyl imidazolidinone, nitromethane, nitroethane, sulfolane, dimethylsulfoxide, and trimethyl phosphate.

In some cases, the refersibility of an electrode reaction can be improved by using the material included in the above-mentioned nonaqueous solvents, whose hydroxyl group(s) all or partially is/are substituted with fluorine atom, depending on an electrode to be combined. These materials may be appropriately used.

Suitable examples of the lithium salt as the electrolyte salt may include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2$(ox) lithium difluoro (oxalato) borate, LiBOB, and LiBr. They may be used alone or as a mixture thereof. Of these, $LiPF_6$ is preferable because high ionic conductivity can be obtained and the cycling characteristics can be improved.

[Separator]

Now, a separator material which can be used in the first embodiment will be described. As the separator material, materials which have been used for conventional batteries can be used. Among them, it is particularly preferable to use microporous polyolefin films, which have good effect for preventing short-circuit and can improve stability of the battery by shutdown effect. For example, microporous films made of polyethylene resin or polypropylene resin are preferable.

As the separator material, it is also preferable to use laminates or mixtures of polyethylene having a lower shutdown temperature and polypropylene having high acid resistance, from the viewpoint that shutdown performance and floating property are well-balanced.

(5-2) Method for Producing Nonaqueous Electrolyte Secondary Battery

Next, a method for producing a nonaqueous electrolyte secondary battery will be described. The method will be described, referring to a cylindrical nonaqueous electrolyte secondary battery as one example.

A cathode 502 is produced as follows. First, for example, a cathode active material, a conductive agent and a binder are mixed to prepare a cathode mixture, and then, the resulting cathode mixture is dispersed in a solvent such as N-methyl-2-pyrrolidone to give a slurry of the cathode mixture.

Subsequently, the slurry of the cathode mixture is coated on a cathode current collector 502A and the solvent is dried, and then, compression-molding is performed using a roller press or the like to form a cathode mixture layer 502B, from which a cathode 502 is formed.

An anode 503 is produced as follows. First, for example, an anode active material and a binder are mixed to prepare an anode mixture, and then, the resulting anode mixture is dispersed in a solvent such as N-methyl-2-pyrrolidone to give a slurry of the anode mixture.

Subsequently, the slurry of the anode mixture is coated on an anode current collector 503A and the solvent is dried, and then, compression-molding is performed using a roll press or the like to form an anode mixture layer 503B, from which an anode 503 is formed.

Next, a cathode lead 513 is attached to the cathode current collector 502A by, for example, welding, and an anode lead 514 is also attached to the anode current collector 503A by welding or the like. Then, the cathode 502 and the anode 503 are wound via a separator 504, and the tip end of the cathode lead 513 is welded to a safety valve mechanism 508 while the tip end of the anode lead 514 is welded to the battery can 501. Subsequently, the wound cathode 502 and anode 503 are sandwiched between a pair of insulating plates 505 and 506, which is housed in the battery can 501.

Then, an electrolyte solution is injected into the battery can 501, whereby the separator 504 is impregnated with the electrolyte solution. Subsequently, a battery lid 507, the safety valve mechanism 508 and a positive temperature coefficient element 509 are crimped at the open end of the battery can 501 via a gasket 510 to fix them to produce a nonaqueous electrolyte secondary battery.

Figure 11:
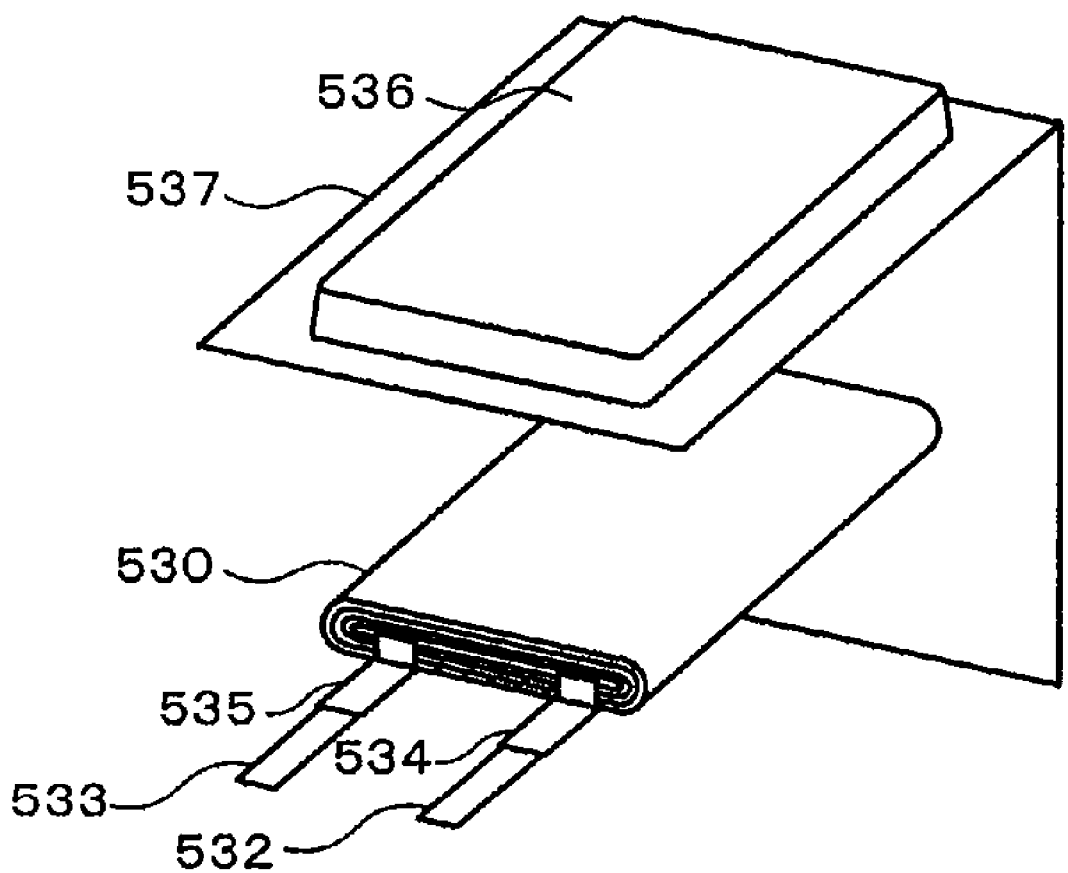
FIG. 11 is a schematic view showing a sixth embodiment which is a nonaqueous electrolyte secondary battery using a cathode active material according to an embodiment.
Figure 12:
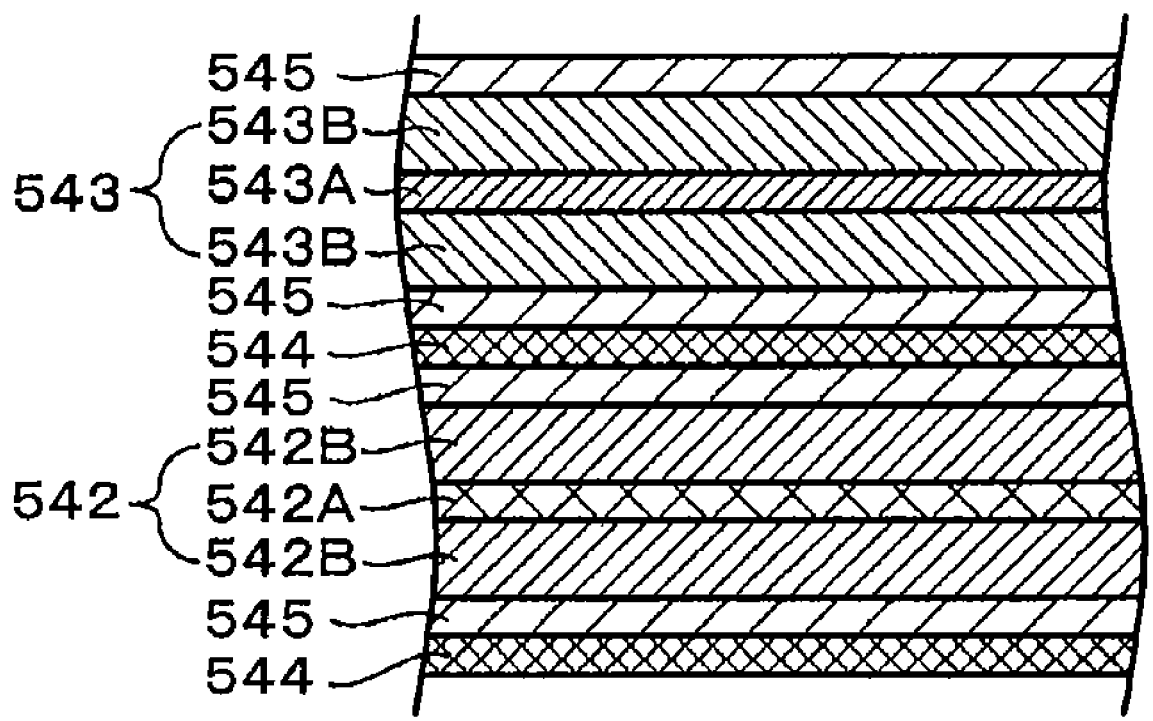
FIG. 12 is an enlarged cross-section showing a battery element shown in FIG. 11.

(6) Sixth Embodiment of Nonaqueous Electrolyte Secondary Battery (6-1) Configuration of Nonaqueous Electrolyte Secondary Battery FIG. 11 shows a structure of a nonaqueous electrolyte secondary battery using the cathode active material according to one embodiment. As shown in FIG. 11, the nonaqueous electrolyte secondary battery has a structure in which a battery element 530 is housed in a covering material 537 made of a moisture-proof laminate film, and the periphery of the battery element 530 is welded to seal. The battery element 530 has a cathode lead 532 and an anode lead 533. These leads are sandwiched with the covering material 537 and drawn to the outside. Both sides of the cathode lead 532 and the anode lead 533 are coated with resin pieces 534 and resin pieces 535, respectively, in order to improve adhesive property to the covering material 537.

[Covering Material]

The covering material 537 has a laminate structure obtained by sequentially laminating, for example, an adhesive layer, a metal layer, and a surface-protecting layer. The adhesive layer is composed of a polymeric film, and examples of the material forming the polymeric film may include polypropylene (PP), polyethylene (PE), cast polypropylene (CPP), linear low density polyethylene (LLDPE), and low density polyethylene (LDPE). The metal layer is composed of a metal foil, and examples of the materials forming the metal foil may include aluminum Al. As the material for the metal foil, metals other than aluminum Al may be used. Examples of the material used for the surface-protecting layer may include nylon Ny and polyethylene terephthalate (PET). The surface of the adhesive layer faces the battery element 530.

[Battery Element]

The battery element 530 is, for example as shown in FIG. 11, a wound battery element 530 wherein a strip anode 543 having gel electrolyte layers 545 formed on both sides thereof, a separator 504, a strip cathode 542 having gel electrolyte layers 545 formed on both sides thereof, and a separator 504 are laminated, and the laminate is wound in a longitudinal direction.

The cathode 542 is composed of a strip cathode current collector 542A, and cathode mixture layers 542B formed on both sides of the cathode current collector 542A. The cathode current collector 542A is a metal foil made of, for example, aluminum Al.

At one end of the cathode 542 in a longitudinal direction is formed a cathode lead 532 which is connected to the electrode by spot welding or ultrasonic welding. As a material for the cathode lead 532, metals such as aluminum may be used.

The anode 543 is composed of a strip anode current collector 543A, and anode mixture layers 543B formed on both sides of the anode current collector 543A. The anode current collector 543A is composed of a metal foil such as copper Cu foil, nickel foil or stainless steel foil.

At the one end of the anode 543 in a longitudinal direction is, similarly to the cathode 542, formed an anode lead 533 which is connected to the electrode by spot welding or ultrasonic welding. For example, copper Cu, nickel Ni and the like may be used as a material for the anode lead 533.

Components other than the gel electrolyte layer 545 are the same as those in the first embodiment, and therefore, the gel electrolyte layer 545 will be described as follows.

The gel electrolyte layer 545 includes an electrolyte solution and a polymer compound which serves as a holder for holding the electrolyte solution, and the gel electrolyte layer 545 is in the state of a gel. The gel electrolyte layer 545 is preferable because when it is used, a high ionic conductivity can be obtained and liquid leakage from the battery can be prevented. The compositions of the electrolyte solution (namely, the solvent liquid, the electrolyte salt and the additives) are the same as in the fifth embodiment.

Examples of the polymer compound may include polyacrylonitrile, polyvinylidene fluoride, copolymers of vinylidene fluoride and hexafluoropropylene, polytetrafluoroethylene, polyhexafluoropropylene, polyethyleneoxide, polypropyleneoxide, polyphosphazene, polysiloxane, polyvinyl acetate, polyvinyl alcohol, methyl polymethacrylate, polyacrylic acid, polymethacrylic acid, styrene-butadiene rubber, nitrile-butadiene rubber, polystyrene, and polycarbonate. From the viewpoint of the electrochemical stability, polyacrylonitrile, polyvinylidene fluoride, polyhexafluoropropylene and polyethyleneoxide are particularly preferable.

(6-2) Method for Producing Nonaqueous Electrolyte Secondary Battery

Next, a method for producing a nonaqueous electrolyte secondary battery using the cathode active material according to one embodiment will be described. First, each of a cathode 142 and an anode 143 is coated with a precursor solution containing a solvent, an electrolyte salt, a polymer compound and a mixed solvent, and then, the mixed solvent is volatilized to form a gel electrolyte layer 145. A cathode lead 132 is previously attached to the end of a cathode current collector by welding, and at the same time, an anode lead 133 is also attached to the end of an anode current collector 143A by welding.

Subsequently, the cathode 542 and the anode 543, both on which the gel electrolyte layers 545 are formed, are laminated via a separator 504, and the resulting laminate is wound in a longitudinal direction to form a wound battery element 530.

Next, a covering material 537 composed of a laminate film is subjected to drawing to form a concave part 536, and the battery element 530 is inserted into the concave part 536. Then, an unprocessed part of the covering material 537 is bent to the top part of the concave part 536, and the periphery of the concave part 536 is welded to seal, whereby a nonaqueous electrolyte secondary battery is produced.

EXAMPLES

The embodiments according to the present application will be described by means of Examples, but the present application is not limited thereto.

Example 9

First, 20 parts by weight of composite oxide particles having an average composition of $Li_{1.03}CoO_{2.01}$, and an average particle size, measured by a laser scattering method, of 13 μm were dispersed by stirring in 300 parts by weight of pure water at 80° C. for 1 hour.

Subsequently, to the dispersion were added 1.60 parts by weight of a commercial reagent, nickel nitrate $Ni(NO_3)_2 \cdot 6H_2O$ and 1.65 parts by weight of a commercial reagent, manganese nitrate $Mn(NO_3)_2 \cdot 6H_2O$, and a 2N aqueous LiOH solution was added thereto over 30 minutes to adjust the pH to 13. The dispersion by stirring was continued at 80° C. for further 3 hours, and then it was allowed to cool.

Next, the dispersion system was washed by decantation, to which 0.1 part by weight of a commercial reagent, ammonium meta-vanadate $NH_4VO_3$ dissolved in 30.0 part by weight of pure water was added. Then, the mixture was washed by decantation, and finally was filtered, and the filtrate was dried at 120° C. to form a precursor.

Then, in order to adjust a lithium amount, 10 parts by weight of the resulting precursor sample was impregnated with 2 parts by weight of a 2N aqueous LiOH solution, which was uniformly mixed, and the mixture was dried to give a precursor for calcination. The temperature of the precursor for calcination was elevated at a rate of 5° C./minute to 950° C. under air stream in an electric furnace, and it was kept at the same temperature for 5 hours, and then was cooled down at a temperature rate of 7° C./minute to 150° C. to give a cathode active material of Example 9.

Example 10

First, 20 parts by weight of the same composite oxide particles used in Example 9 were dispersed by stirring in 300 parts by weight of a 2N aqueous LiOH solution at 80° C. for 2 hours (this system had a pH of 14.2). Subsequently, 10 parts by weight of an aqueous solution was prepared by adding pure water to 1.60 parts by weight of a commercial reagent, nickel nitrate $Ni(NO_3)_2 \cdot 6H_2O$ and 1.65 parts by weight of a commercial reagent, manganese nitrate $Mn(NO_3)_2 \cdot 6H_2O$. The whole quantity, 10 parts by weight, of the aqueous solution was added to the dispersion obtained above over 2 hours, and dispersion by stirring was continued at 80° C. for further 1 hour, followed by cooling.

Next, the dispersion system was washed by decantation, to which 0.2 part by weight of a commercial reagent, sodium meta-vanadate $NaVO_3$ dissolved in 20.0 parts by weight of pure water was added. Then, the mixture was washed by decantation, and finally was filtered, and the filtrate was dried at 120° C. to form a precursor. The temperature of the resulting precursor was elevated to 950° C. at a rate of 5° C./minute under air stream in an electric furnace, and it was kept at the same temperature for 5 hours, and then was cooled down at a temperature rate of 7° C./minute to 150° C. to give a cathode active material of Example 10.

Example 11

A cathode active material of Example 11 was produced in the same manner as in Example 10 except that 20 parts by weight of an aqueous solution was prepared by adding pure water to 3.20 parts by weight of a commercial reagent, nickel nitrate $Ni(NO_3)_2 \cdot 6H_2O$ and 3.30 parts by weight of a commercial reagent, manganese nitrate $Mn(NO_3)_2 \cdot 6H_2O$, and the whole quantity, 20 parts by weight, of the resulting aqueous solution was added over 3 hours; and that 0.2 part by weight of a commercial reagent, ammonium meta-vanadate $NH_4VO_3$ was dissolved in 50.0 parts by weight of pure water and the resulting aqueous solution was added.

Comparative Example 5

The same composite oxide particles as used in Example 9, which had an average composition of $Li_{1.03}CoO_{2.01}$, and an average particle size, measured by a laser scattering method, of 13 μm, were used as a cathode active material of Comparative Example 5.

Comparative Example 6

A cathode active material of Comparative Example 6 was produced in the same manner as in Example 9 except that 0.1 part by weight of the ammonium meta-vanadate $NH_4VO_3$ was not added.

Evaluation:

Using the cathode active materials produced in Examples 9 to 11 and Comparative Examples 5 and 6, secondary batteries shown in FIGS. 9 and 10 were produced. First, 86 wt % of the produced cathode active material powder, 10 wt % of glaphite as a conductive agent, and 4 wt % of polyvinylidene fluoride as a binder were mixed, and the mixture was dispersed in a solvent, N-methyl-2-pyrrolidone (NMP). Then, the dispersion was coated on both sides of a cathode current collector 502A composed of a strip aluminum foil having a thickness of 20 μm, and the obtained collector was dried. Subsequently, compression-molding was performed by using a roller press to form a cathode mixture layer 502B, from which a cathode 502 was produced. At that time, the cathode active material powder was thoroughly pulverized with a kneader so as to pass through a sieve having an opening of 70 μm. A void ratio of the cathode mixture layer 502B was controlled to a volume ratio of 26%. Next, an aluminum cathode lead 513 was attached to the cathode current collector 502A.

Separately, 90 wt % of an artificial graphite powder as an anode active material and 10 wt % of polyvinylidene fluoride as a binder were mixed, and the mixture was dispersed in a solvent, N-methyl-2-pyrrolidone. Then, the dispersion was coated on both sides of an anode current collector 503A composed of a strip copper foil having a thickness of 10 μm, and the obtained collector was dried. Subsequently, compression-molding was performed by using a roller press to form an anode mixture layer 503B, from which an anode 503 was produced. Next, a nickel anode lead 514 was attached to the anode current collector 503A.

The thus obtained strip cathode 502 and the strip anode 503 were wound in large number of turns via a porous polyolefin film as a separator 544, to produce spirally wound electrode assembly 520. The wound electrode assembly 520 was housed in an iron battery can 501, and a pair of insulating plates 505 and 506 were placed on the top side and bottom side of the wound electrode assembly 520. Then, the cathode lead 513 was drawn out of the cathode current collector 502A, and was welded to a safety valve mechanism 508. Similarly, the anode lead 514 was drawn out of the anode current collector 503A and was welded to the bottom part of the battery can 501. Thereafter, an electrolyte solution was injected to the inside of the battery can 501, and the battery can 501 was crimped via a gasket 510 to fix the safety valve mechanism 508, a positive temperature coefficient element 509 and a battery lid 507, thereby obtaining a cylindrical secondary battery having an outer diameter of 18 mm and a height of 65 mm. As the electrolyte solution, a solution obtained by dissolving 1.0 mol/l of an electrolyte salt, $LiPF_6$ in a solvent of ethylene carbonate and diethyl carbonate (1:1 by volume) was used.

The thus produced secondary batteries were subjected to charge and discharge at a temperature of 45°, thereby determining an initial capacity, which was a discharge capacity at the first cycle, and a discharge capacity maintenance rate, which was a ratio of a discharge capacity at the 200-th cycle to that of the first cycle.

The charge was conducted by performing constant current charge until a battery voltage reached 4.40 V with a constant current of 1000 mA, and then performing constant voltage charge until the total charging time with a constant volume of 4.40 V reached 2.5 hours. The discharge was conducted by performing constant current discharge until a battery voltage reached 2.75 V with a constant current of 800 mA. The measurement results are shown in Table 3.

TABLE 3

| | INITIAL CAPACITY (mAh) | DISCHARGE CAPACITY MAINTENANCE RATE (%) |
|---|---|---|
| Example 9 | 2440 | 83 |
| Example 10 | 2430 | 85 |
| Example 11 | 2440 | 86 |
| COMPARATIVE EXAMPLE 5 | 2440 | 34 |
| COMPARATIVE EXAMPLE 6 | 2450 | 81 |

As shown in Table 3, it is understood that the batteries using the cathode active materials obtained in Examples 9 to 11 had high capacities, and higher discharge capacity maintenance rates than those of the batteries using the cathode active materials obtained in Comparative Examples 5 and 6.

Various modifications and applications can be made without departing from the scope of the present application. For example, the shapes thereof are not particularly limited, and cylindrical types, square types, coin types, button types, and the like may be used.

In the fifth embodiment, the nonaqueous electrolyte secondary battery has the electrolyte solution as the electrolyte, and in the sixth embodiment, the nonaqueous electrolyte secondary battery has the gel electrolyte as the electrolyte. However, the present application is not limited thereto.

For example, not only the electrolytes mentioned above, but also polymer solid electrolytes utilizing an ionically conductive polymer, inorganic solid electrolytes utilizing an ionically conductive inorganic material, and the like may be used as the electrolyte. Further, they may be used alone or as a mixture with another electrolyte. Examples of the polymer compound used in the polymer solid electrolyte may include polyether, polyester, polyphosphazene, and polysiloxane. Examples of the inorganic solid electrolyte may include ionically conductive ceramics, ionically conductive crystal, and ionically conductive glass.

Further, for example, the electrolyte solution in the nonaqueous electrolyte secondary battery is not particularly limited, and conventional nonaqueous solvent system electrolyte solutions may be used. Of these, preferable examples of the nonaqueous electrolyte solution including an alkali metal salt in the secondary battery include propylene carbonate, ethylene carbonate, γ-butyrolactone, N-methylpyrrolidone, acetonitrile, N,N-dimethylformamide, dimethylsulfoxide, tetrahydrofuran, 1,3-dioxolane, methyl formate, sulfolane, oxazolidone, thionyl chloride, 1,2-dimethoxyethane, diethylenecarbonate, derivatives thereof, and mixtures thereof. Preferable examples of the electrolyte contained in the electrolyte solution include alkali metals, particularly calcium halide, perchlorate, thiocyanogen salts, fluoroborates, fluorophosphates, arsenic fluoride, yttrium fluoride, and trifluoromethylsulfuric acid salts.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material comprising:
   a coating layer which is formed on at least a part of a composite oxide particle and contains an oxide including lithium Li and an oxide including a coating element including nickel, or nickel and manganese; and a surface layer which is formed on at least a part of the coating layer and includes molybdenum, wherein the composite oxide particle has an average composition represented by formula 1:

$$Li_{(1+x)}Co_{(1-y)}M_yO_{(2-z)} \qquad \text{(formula 1)}$$

wherein M is at least one element selected from the group consisting of magnesium, aluminum, boron, titanium, vanadium, chromium, manganese, iron, nickel, copper, zinc, molybdenum, tin, and tungsten; and x, y and z satisfy the relationships of $-0.10 \leq x \leq 0.10$, $0 \leq y < 0.50$, and $-0.10 \leq z \leq 0.20$.

2. The cathode active material according to claim 1, wherein a composition ratio of the nickel and the manganese in the coating layer ranges from 99:1 to 30:70.

3. The cathode active material according to claim 1, wherein not more than 40 mol % of the total amount of the nickel and the manganese in the oxides in the coating layer is substituted with at least one metal element selected from the group consisting of magnesium, aluminum, boron, titanium, vanadium, chromium, iron, cobalt, copper, zinc, molybdenum, tin, and tungsten.

4. The cathode active material according to claim 1, wherein an amount of the coating layer ranges from 0.5 wt % to 50 wt % based on the composite oxide particles.

5. The cathode active material according to claim 1, which has an average particle size of 2.0 μm to 50 μm.

6. A nonaqueous electrolyte secondary battery comprising:
a cathode having a cathode active material;
an anode;
a separator; and
an electrolyte, wherein
the cathode active material includes
a coating layer which is formed on at least a part of a composite oxide particle and contains an oxide including lithium and an oxide including a coating element of at least one of nickel and manganese, and
a surface layer which is formed on at least a part of the coating layer and includes molybdenum, and
the composite oxide particle has an average composition represented by formula 1:

$$Li_{(1+x)}Co_{(1-y)}M_yO_{(2-z)} \qquad \text{(formula 1)}$$

wherein M is at least one element selected from the group consisting of magnesium, aluminum, boron, titanium, vanadium, chromium, manganese, iron, nickel, copper, zinc, molybdenum, tin, and tungsten; and x, y and z satisfy the relationships of $-0.10 \leq x \leq 0.10$, $0 \leq y < 0.50$, and $-0.10 \leq z \leq 0.20$.

* * * * *